United States Patent
Ishida et al.

(10) Patent No.: US 11,158,747 B2
(45) Date of Patent: Oct. 26, 2021

(54) IMAGE SENSOR AND IMAGE-CAPTURING DEVICE

(71) Applicant: NIKON CORPORATION, Tokyo (JP)

(72) Inventors: Tomohisa Ishida, Tokyo (JP); Yoshiyuki Watanabe, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/764,419

(22) PCT Filed: Sep. 26, 2016

(86) PCT No.: PCT/JP2016/078278
§ 371 (c)(1),
(2) Date: Mar. 29, 2018

(87) PCT Pub. No.: WO2017/057277
PCT Pub. Date: Apr. 6, 2017

(65) Prior Publication Data
US 2018/0294300 A1 Oct. 11, 2018

(30) Foreign Application Priority Data
Sep. 30, 2015 (JP) .............................. JP2015-195347

(51) Int. Cl.
H01L 27/146 (2006.01)
H01L 31/0232 (2014.01)
(Continued)

(52) U.S. Cl.
CPC ...... H01L 31/0232 (2013.01); H01L 27/1464 (2013.01); H01L 27/14609 (2013.01);
(Continued)

(58) Field of Classification Search
CPC .......... H01L 27/14627; H01L 27/1464; H01L 27/14623; H04N 5/378
See application file for complete search history.

(56) References Cited

U.S. PATENT DOCUMENTS

2005/0167704 A1    8/2005  Ezaki et al.
2007/0170477 A1*   7/2007  Kuriyama ........... H01L 27/1462
                                                        257/292
(Continued)

FOREIGN PATENT DOCUMENTS

JP    2005/223084 A    8/2005
JP    2010-212668 A    9/2010
(Continued)

OTHER PUBLICATIONS

Dec. 20, 2016 International Search Report issued in International Patent Application No. PCT/JP2016/078278.
(Continued)

Primary Examiner — Kenneth Parker
Assistant Examiner — Long H Le
(74) Attorney, Agent, or Firm — Oliff PLC

(57) ABSTRACT

An image sensor includes: a semiconductor substrate having a light receiving unit that receives incident light passed through a microlens; and a light shielding unit that blocks a part of the light passed through the microlens and enters the semiconductor substrate. The light receiving unit receives the incident light passed through the microlens, between the microlens and the light shielding unit.

17 Claims, 22 Drawing Sheets

(51) Int. Cl.
　　*H04N 5/369*　　(2011.01)
　　*H04N 5/378*　　(2011.01)
(52) U.S. Cl.
　　CPC .. *H01L 27/14623* (2013.01); *H01L 27/14625* (2013.01); *H01L 27/14627* (2013.01); *H01L 27/14629* (2013.01); *H04N 5/378* (2013.01); *H01L 27/14612* (2013.01); *H01L 27/14636* (2013.01); *H01L 27/14643* (2013.01)

(56) References Cited

U.S. PATENT DOCUMENTS

| | | | | |
|---|---|---|---|---|
| 2008/0283726 | A1* | 11/2008 | Uya | H01L 27/14603 250/208.1 |
| 2010/0201834 | A1* | 8/2010 | Maruyama | H01L 31/18 348/222.1 |
| 2010/0230729 | A1 | 9/2010 | Ellis-Monaghan et al. | |
| 2012/0217602 | A1* | 8/2012 | Enomoto | H04N 5/374 257/432 |
| 2013/0161774 | A1* | 6/2013 | Okigawa | G02B 3/0056 257/432 |
| 2014/0347538 | A1* | 11/2014 | Toda | H01L 27/14603 348/308 |
| 2015/0002718 | A1 | 1/2015 | Nomura | |
| 2015/0035100 | A1* | 2/2015 | Tanida | H01L 27/14623 257/432 |
| 2015/0084144 | A1* | 3/2015 | Suzuki | H01L 27/14645 257/432 |
| 2015/0129943 | A1 | 5/2015 | Kato et al. | |
| 2015/0256769 | A1* | 9/2015 | Kim | H01L 27/14607 348/302 |
| 2016/0126266 | A1 | 5/2016 | Kato et al. | |
| 2016/0211306 | A1* | 7/2016 | Choi | H01L 27/14634 |
| 2016/0322412 | A1 | 11/2016 | Yamamoto et al. | |

FOREIGN PATENT DOCUMENTS

| | | |
|---|---|---|
| JP | 2011-003860 A | 1/2011 |
| JP | 2013-098446 A | 5/2013 |
| JP | 5547260 B2 | 7/2014 |
| JP | 2015-095468 A | 5/2015 |
| KR | 2015-0105861 A | 9/2015 |
| WO | 2013/065569 A1 | 5/2013 |
| WO | 2015/119186 A1 | 8/2015 |

OTHER PUBLICATIONS

Jan. 21, 2020 Office Action issued in Japanese Patent Application No. 2017-543259.
Aug. 25, 2020 Office Action issued in Japanese Application No. 2017-543259.
Aug. 25, 2020 Decision of Dismissal of Amendment in Japanese Application 2017-543259.
May 7, 2021 Office Action issued in European Patent Application No. 16851448.7.
Aug. 12, 2019 Office Action issued in Korean Patent Application No. 10-2018-7009049.
Mar. 27, 2019 Extended European Search Report issued in European Patent Application No. 16851448.7.
May 28, 2019 Office Action issued in Japanese Patent Application No. 2017-543259.
Sep. 21, 2020 Office Action issued in Korean Application No. 2018-7009049.
Feb. 20, 2020 Office Action issued in Korean Patent Application No. 10-2018-7009049.
Jul. 20, 2021 Office Action in Korean Application No. 10-2018-7009049.

* cited by examiner

FIG.4
(a)
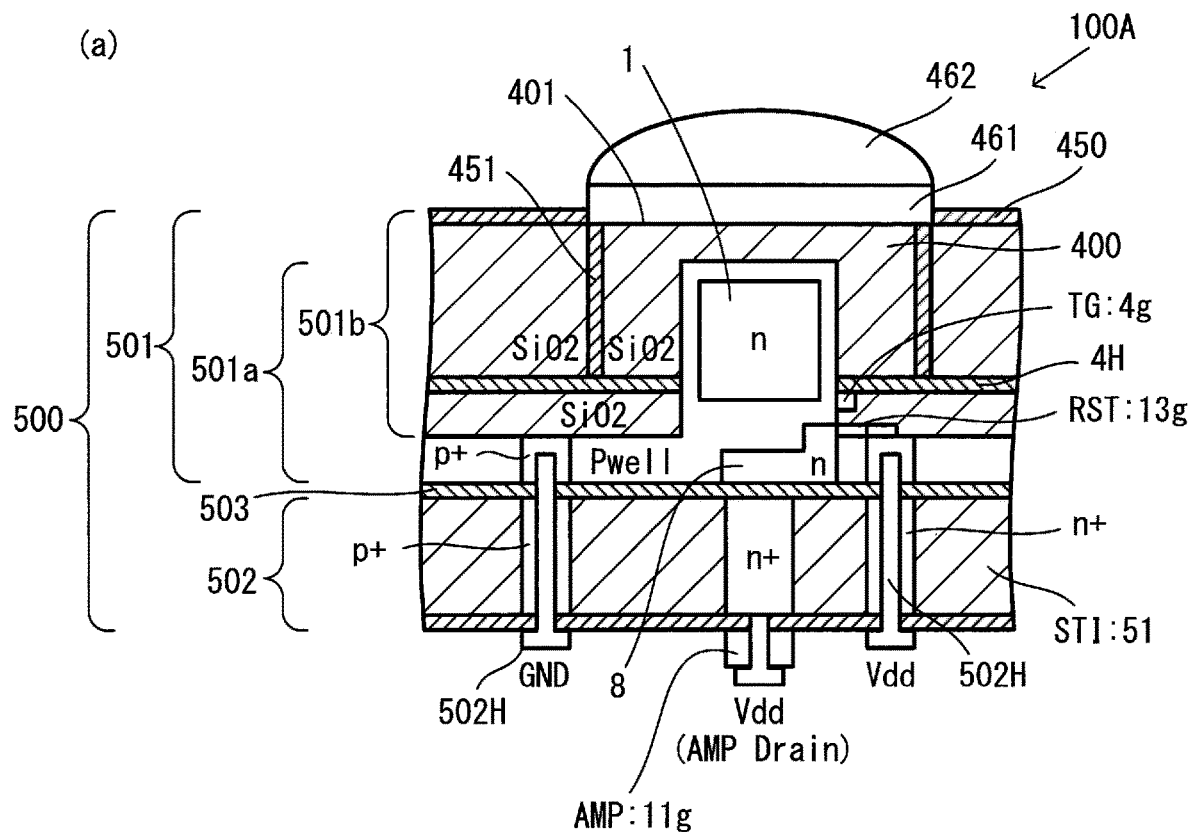
(b)
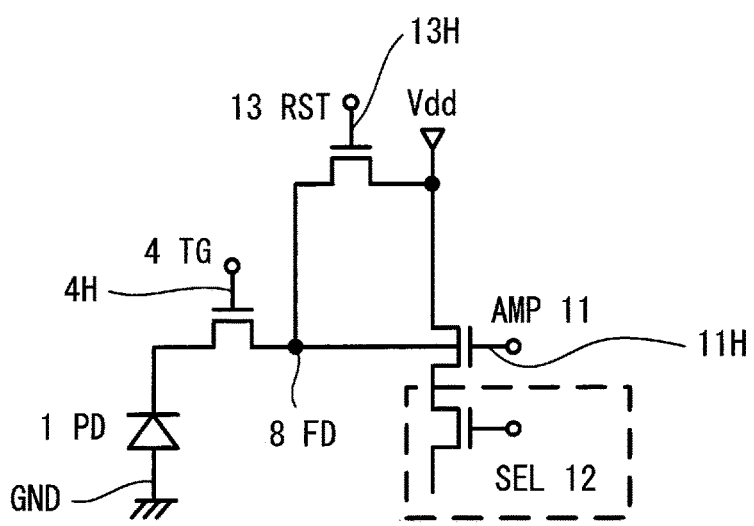

IMAGE SENSOR AND IMAGE-CAPTURING DEVICE

TECHNICAL FIELD

The present invention relates to an image sensor and an image-capturing device.

BACKGROUND ART

PTL1 discloses the following solid-state image sensor.

A semiconductor substrate is provided with an image-capturing region including a photoelectric conversion unit and a signal scan circuit unit and having unit pixels arranged in a matrix. The image-capturing region includes an field isolation insulating film that is provided to correspond to a boundary portion between adjacent unit pixels and surround each unit pixel; a MOSFET provided on a front surface of the semiconductor substrate and in a region below the field isolation insulating film; and a first diffusion layer having a first conductive type provided in a region in the vicinity of the field isolation insulating film in the semiconductor substrate. The field isolation insulating film is provided in the semiconductor substrate at an offset from the front surface of the semiconductor substrate on which the signal scan circuit unit is formed, and reaches a back surface of the semiconductor substrate. The MOSFET includes a gate electrode and a second diffusion layer having the first conductive type formed in the semiconductor substrate and above the gate electrode. The first diffusion layer and the second diffusion layer contact each other. In a vertical direction of the semiconductor substrate, the center of the width of the first diffusion layer along a first direction orthogonal to the vertical direction is located in the vicinity of the center of the width of the second diffusion layer along the first direction.

CITATION LIST

Patent Literature

PTL1: Japanese Patent No. 5547260

SUMMARY OF INVENTION

However, in high speed readout (e.g., 100 to 10000 frames/sec) required in recent years, exposure time reduces. Therefore, the amount of electric charge generated by photoelectric conversion decreases, which lead to a deterioration in the sensitivity.

According to the first aspect of the present invention, an image sensor comprises: a semiconductor substrate having a light receiving unit that receives incident light passed through a microlens; and a light shielding unit that blocks a part of the light passed through the microlens and enters the semiconductor substrate. The light receiving unit receives the incident light passed through the microlens, between the microlens and the light shielding unit.

According to the second aspect of the present invention, an image-capturing device comprises: an image sensor and a generation unit that generates image data based on a signal outputted from the image sensor. The image sensor comprises: a semiconductor substrate having a light receiving unit that receives incident light passed through a microlens; and a light shielding unit that blocks a part of the light passed through the microlens and enters the semiconductor substrate. The light receiving unit receives the incident light passed through the microlens, between the microlens and the light shielding unit.

BRIEF DESCRIPTION OF DRAWINGS

FIG. 4($a$) is a cross-sectional view schematically illustrating a pixel 20 of a second embodiment and FIG. 4($b$) is a view illustrating an equivalent circuit of FIG. 4($a$).

DESCRIPTION OF EMBODIMENTS

First Embodiment

Schematic Element Structure

Figure 1:
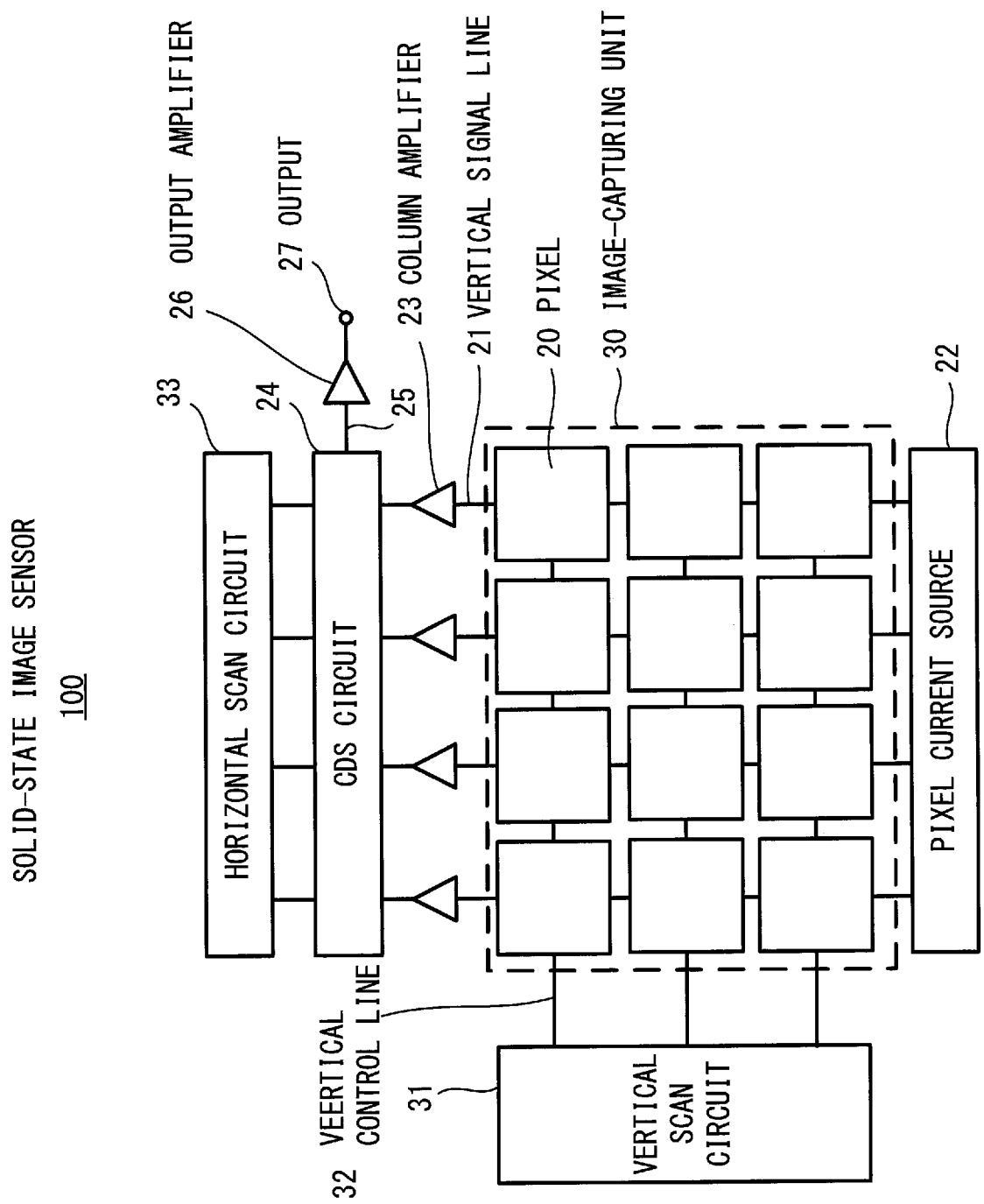
FIG. 1 is a view illustrating a schematic configuration of a solid-state image sensor 100 according to a first embodiment.

FIG. 1 is a view illustrating a schematic configuration of a solid-state image sensor 100 according to a first embodiment.

The solid-state image sensor 100 includes an image-capturing unit 30 having pixels 20 arranged on a light receiving surface. The pixels 20 are supplied with drive pulses from a vertical scan circuit 31 via vertical control lines 32. Further, the pixels 20 are connected to vertical signal lines 21 on a column basis. The vertical signal lines 21 are connected to a pixel current source 22.

Furthermore, noise outputs and signal outputs that are time-divisionally outputted from the pixels 20 to the vertical signal lines 21 are sequentially inputted to a CDS circuit (a correlated double sampling circuit) 24 via column amplifiers 23. The CDS circuit 24 calculates a difference between both outputs to generate a true signal output. This true signal output is horizontally scanned by a drive signal from a horizontal scan circuit 33 and sequentially outputted to a horizontal signal line 25. A signal output of the horizontal signal line 25 is outputted to an output terminal 27 via an output amplifier 26.

Equivalent Circuit of Pixel 20

Figure 2:
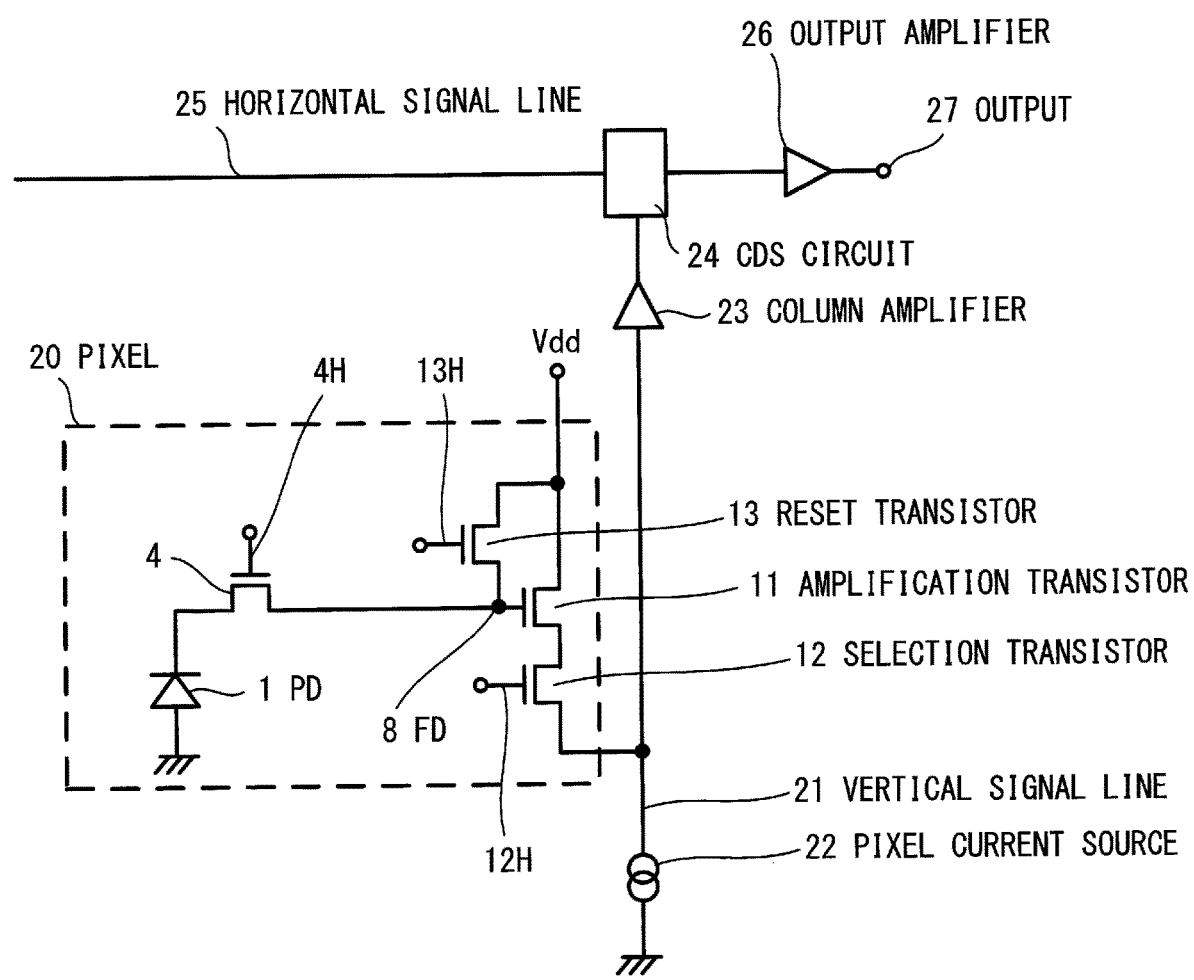
FIG. 2 is a view illustrating an equivalent circuit of a pixel 20 of the first embodiment.

FIG. 2 is a view illustrating an equivalent circuit of the pixel 20 described above. The pixel 20 is provided with a photodiode (PD) 1. The PD 1 is connected to a floating diffusion (FD) 8 via a transfer transistor (TG: hereinafter also referred to as a transfer gate) 4 which is gate-controlled by a transfer drive signal (a transfer gate voltage). The FD 8 is connected to a gate electrode of an amplification transistor (AMP) 11. The FD 8 is also connected to a reference potential Vdd via a reset transistor (RST: hereinafter also referred to as a reset gate) 13 which is gate-controlled by a reset drive signal (a reset gate voltage). The amplification transistor 11 has a drain connected to the potential Vdd and a source connected to the vertical signal line 21 via a selection transistor (SEL: hereinafter also referred to as a selection gate) 12 which is gate-controlled by a selection drive signal (a selection gate voltage).

The transfer gate voltage of the transfer transistor 4 is supplied via a transfer wiring 4H. The reset gate voltage of the reset transistor 13 is supplied via a reset wiring 13H. The selection gate voltage of the selection transistor 12 is supplied via a selection wiring 12H. The transfer wiring 4H, the reset wiring 13H, and the selection wiring 12H are formed in a wiring region (a wiring layer) 203 in the substrate having the PD 1 and the FD 8 formed thereon.

Other parts of the configuration are the same as those in FIG. 1 and repetitive description thereof will thus be omitted herein.

In the first embodiment, a top gate electrode of the amplification transistor 11 is connected to a potential of the FD 8 and a back gate electrode thereof is connected to a GND potential. The same also applies to fourth and fifth embodiments described hereinafter. In a second embodiment described hereinafter (see FIG. 4(b)), the top gate electrode of the amplification transistor 11 is connected to a predetermined potential and the back gate electrode thereof is connected to the potential of the FD 8. In a third embodiment described hereinafter (see FIG. 10), both the top gate electrode and the back gate electrode of the amplification transistor 11 are connected to the potential of the FD 8.

Element Structure of Pixel 20

Figure 3:
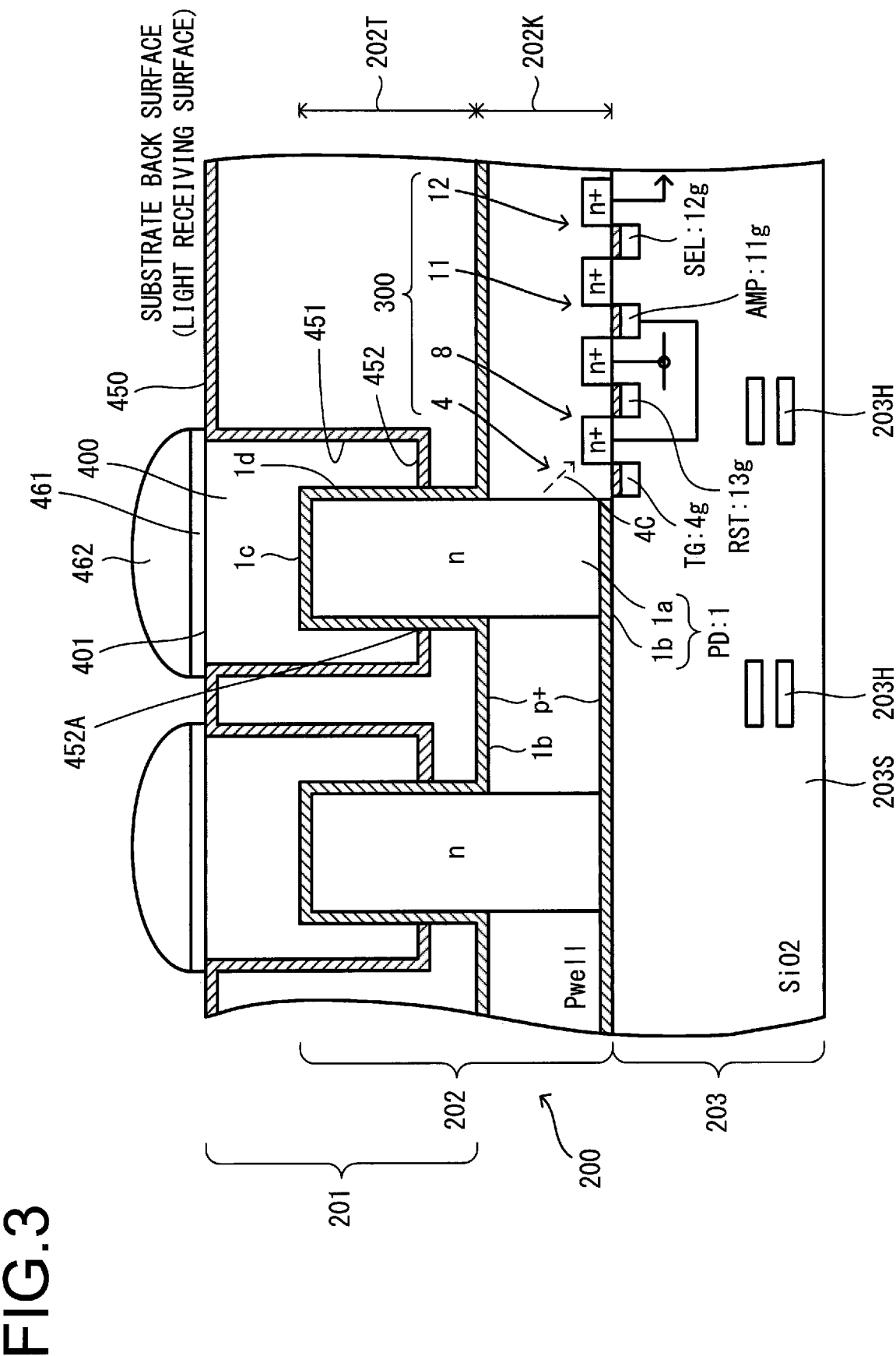
FIG. 3 is a cross-sectional view of the pixel 20 of the first embodiment.

FIG. 3 is a cross-sectional view illustrating a part of an element structure of the pixel 20. Incident light enters from above in FIG. 3.

The solid-state image sensor 100 is formed on a semiconductor substrate 200. The semiconductor substrate 200 is a monolithic semiconductor substrate. The semiconductor substrate 200 is composed of generally three layers laminated from top (a light receiving surface side) to bottom (a wiring region side) in FIG. 3. An oxide film 201 is formed as the uppermost layer, a wiring region 203 is formed as the lowermost layer, and a diffusion region 202 is formed between the oxide film 201 and the wiring region 203. The diffusion region 202 is also referred to as a semiconductor region. The wiring region 203 is formed by oxide layer except for wiring portion. It should be noted that the oxide film and the oxide layer are a film and a layer mainly composed of a region formed by oxidizing the semiconductor substrate.

Semiconductor Region 202

The semiconductor region (the diffusion region) 202 of the semiconductor substrate 200 is provided with vertically elongated PDs 1 that extend in a thickness direction (a light incident direction) of the substrate and signal readout circuits 300 that are disposed in an in-plane direction of the substrate. The semiconductor region 202 has a base region 202K and a protruding region 202T extending from the base region 202K to the side of the light receiving surface onto which light enters. The PDs 1 are formed in the protruding region 202T, and the signal readout circuits 300 are formed in the base region 202K. The PDs 1 and the signal readout circuits 300 are formed by selectively implanting a p-type impurity and an n-type impurity into predetermined portions of a p-type region at an appropriate concentration.

The semiconductor region 202 is provided with the PDs 1 converting incident light into electric charges by photoelectric conversion and the signal readout circuits 300 for outputting the electric charges photoelectric converted by the PDs 1 as pixel signals to the vertical signal lines 21.

The signal readout circuit 300 formed in the semiconductor region 202 includes the transfer transistor 4 which transfers the electric charge of the PD 1 to the FD 8; the FD 8 which accumulates the transferred electric charge and converts it into a voltage; the amplification transistor 11 which amplifies the output voltage of the FD 8; the selection transistor 12 which selects a pixel; and the reset transistor 13 which resets the FD 8.

The transfer transistor 4 transfers the electric charge generated in the PD 1 to the FD 8 when a gate voltage is applied to a gate electrode 4g.

The FD 8 is a capacitor that accumulates the electric charge transferred from the transfer transistor 4 and converts it into voltage. The electric charge generated in the PD 1 by photoelectric conversion is converted into voltage by the capacitor of the FD 8, and the voltage serves as the gate voltage of the amplification transistor 11. Since a pixel signal of the pixel 20 is based on a value obtained by dividing the electric charge Q generated in the PD 1 by the capacitance C of the FD 8, an reduction in the capacitance of the FD 8 contributes to an improvement in the sensitivity of the image sensor.

The amplification transistor 11 amplifies the voltage of the FD 8 applied to the gate electrode 11g. The voltage amplified by the amplification transistor 11 is outputted as the pixel signal from the selection transistor 12.

The reset transistor 13 discharges the electric charge accumulated in the FD 8 and resets the FD 8 to the reference potential Vdd, when the gate voltage is applied to a gate electrode 13g.

Wiring Region 203

The wiring region 203 is provided with wirings 203H. The wiring 203H includes the transfer wiring 4H, the reset wiring 13H, and the selection wiring 12H, which are described above.

Oxide Film 201

A front surface of the oxide film 201, i.e., the light receiving surface, which is a back surface of the semiconductor substrate 200, has a light shielding film 450 formed thereon. The light shielding film 450 is provided to prevent light from entering the signal readout circuit 300 or other elements. The light shielding film 450 has an opening 401 to allow light to enter the PD 1. The light shielding film 450 blocks at least a part of the semiconductor region 202 from light.

Detailed Description of PD 1

The PD 1 will be explained in detail with reference to FIG. 3.

The PD 1 is a photoelectric conversion unit having a p-n junction which is formed by selectively implanting an n-type impurity into a predetermined region of a p-type semiconductor region 202. The PD 1 is formed in a prismatic shape. The inside of the prism is an n-type photoelectric conversion region 1a, while the surface of the prism is a p+ region 1b. Then region is exposed in a part of the surface of the PD 1. By applying a gate voltage to the gate electrode 4g of the transfer transistor 4, an electric current based on the electric charge accumulated in the PD 1 flows so that the electric charge is accumulated in the FD 8. It should be noted that the PD 1 is not limited to the prism, but may have any three-dimensional shape extending in the light incident direction. For example, the PD 1 may be a cylinder, an elliptic cylinder, a pyramid, a cone, an elliptic cone, a sphere, an ellipsoid, a polyhedron, or other shape.

The p+ region in the surface region 1b of the PD 1 prevents a depletion layer of the photoelectric conversion region 1a from reaching the surface. The depletion layer prevents a dark current generated at a semiconductor interface from flowing to the photoelectric conversion region 1a. In other words, the PD 1 in the first embodiment is an embedded photodiode.

The PD 1 protrudes from the semiconductor region 202, in which the signal readout circuit 300 is formed, to the light receiving surface side. In other words, the PD 1 is formed in the protruding region 202T that extends and protrudes from the base region 202K of the semiconductor region 202, in which the signal readout circuit 300 is formed, to the light receiving surface side. In FIG. 3, the PD 1 thus has a protruding shape that extends from the base region 202K, in which the signal readout circuit 300 is formed, to the light receiving surface side. In other words, at least a part of the PD 1 has a protrusion that extends along the light incident direction. At least a part of the PD 1 extends to the light incident direction beyond an opening 452A (see FIG. 3) of the light shielding film 452 described hereinafter and thus is closer to the light receiving surface with respect to the light shielding film 452. It should be noted that at least a part of the PD 1 may extend toward the light incident side beyond the reflection film 450 or the opening 401.

Oxide Film 210

The oxide film 201 is formed on the light receiving surface side of the semiconductor substrate 200. The optical path region 400 through which incident light travels is formed on an outer periphery of the PD 1 formed in the protruding region 202T of the semiconductor region 202. The cross-sectional shape of the optical path region 400 and the shape of the opening 401 are the same as the cross-sectional shape of the PD 1. The cross section on the light receiving surface side of the optical path region 400 is rectangular, while the cross section from the top surface 1c of the PD to the light shielding film 452 of the optical path region 400; i.e., the cross section on the bottom side (the wiring region side) of the optical path region 400 is angular ring. The optical path region 400 has an oxide layer deposited thereon. The opening 401 is rectangular.

The inside material of the optical path region 400 is not limited to the layer of oxide, and any material can be used, as long as the transmittance of visible light region is not less than a predetermined value. The optical path region 400 may be hollow. It should be noted that the cross-sectional shape of the optical path region 400 and the shape of the opening 401 are not limited to be rectangular. For example, the cross section of the optical path region 400 and the opening 401 may be shaped as a circle, an ellipse, a polygon, or an circular ring.

A reflection film 451 is formed on an inner surface of the optical path region 400, and the light shielding film 452 is formed on the bottom (a bottom surface on the wiring region side) of the optical path region 400. The PD 1 is formed passing through the opening 452A of the light shielding film 452 and protruding toward a microlens 462 from the base region 202K. The reflection film 451 and the light shielding film 452 can be formed with aluminum or other materials having a high reflectivity, using PVD. The reflection film 451 and the light shielding film 452 may be formed with the same material or different materials, as long as the reflection film 451 is formed with a material having high reflectivity and the light shielding film 452 is formed with a material having low light transmittance.

The opening 401 of the optical path region 400 is provided with a color filter 461 and the microlens 462. The color filter 461 and the microlens 462 may be omitted, as will be described hereinafter.

The wiring region 203 below the semiconductor region 202 has various wirings 203H formed therein, which are insulated from each other by an oxide layer 203S. The wirings 203H includes various wirings, such as the vertical signal line 21 or the like, for outputting a pixel signal from each of the pixel 20 to an image memory or the like formed on an external chip, i.e. other semiconductor substrate. The wirings 203H also includes the transfer wiring 4H, the reset wiring 13H, the selection wiring 12H, or the like, described above.

Photoelectric conversion operation by the above-described solid-state image sensor 100 will now be described.

The light receiving surface of the solid-state image sensor 100 has pixels arranged in a matrix. Light incident onto the image sensor 100 is condensed by the microlens 462 which is provided for each pixel. The light condensed by the microlens 462 is wavelength-selected by the color filter 461 and then enters the optical path region 400 via the opening 401. A part of the incident light enters the inside of the PD 1 via the surface 1c thereof. Among the light incident onto the optical path region 400, the light except for the light incident into the PD 1 via the surface 1c, i.e., the light incident onto the optical path region 400 between a side surface 1d of the PD 1 and the reflection film 451 is reflected by the reflection film 451 and enters into the PD 1 via the side surface 1d. The PD 1 photoelectrically converts the incident lights, which enter via the surface 1c and the side surface 1d, to an electric charge. This enables the PD 1 to more efficiently generate the electric charge from the incident light.

The light incident onto the bottom of the optical path region 400 is blocked by the light shielding film 452. The light shielding film 452 prevents the incident light from entering the semiconductor region 202 where the signal readout circuit 300 is formed. This can reduce noise generation due to the light incident to the readout circuit 300.

The PD 1 has a protruding shape as described above, and has the light shielding film 452 has an opening 452A (see FIG. 3) in a region where the PD 1 extends toward the light incident side.

By turning the transfer transistor 4 at a time when a predetermined accumulation time has elapsed after resetting the PD 1 and the FD 8 by the transfer transistor 4 and the reset transistor 13, a detection current based on the electric charge accumulated in the PD 1 allows the electric charge to be accumulated in the FD 8. A voltage based on the capacitance of the FD 8 is applied to the gate electrode 11g of the amplification transistor 11 and the amplification transistor 11 amplifies the voltage of the FD 8. The amplified voltage is selected by the selection transistor 12 and outputted as a pixel signal to the vertical signal line 21.

The detection current from the PD 1 to the FD 8 flows in a direction having a component in a thickness direction of the surface of the semiconductor substrate as indicated by an arrow 4C.

In a solid-state image sensor according to PTL1, a signal readout circuit, that reads out an electric charge as a pixel signal, transfers the signal between a transfer circuit, an amplification circuit, and a selection circuit along a surface of the semiconductor substrate.

In the solid-state image sensor 1 according to the first embodiment, the signal path from the PD 1 to the FD 8 is the path 4C having the component in the thickness direction of the substrate. Accordingly, the size of the transfer transistor 4 in the in-plane direction of the substrate can be reduced. A reduction in size of the pixel can thus be achieved.

The following advantageous effects are achieved though the solid-state image sensor according to the first embodiment described above.

(1) The solid-state image sensor 100 includes the semiconductor region 202 provided with the PD (the photoelectric conversion region) that photoelectrically converts incident light to generate the electric charge and a readout circuit 300 including the FD (the electric charge transfer region) 8 to which the electric charge is transferred from the PD 1. The semiconductor region 202, that is, at least a part of the PD 1 protrudes into the optical path region (the incident region) 400 provided on the light receiving surface side.

Such a configuration of the PD 1 allows a light receiving area of the PD 1 to be increased, since the incident lights enter from the surface 1c and the side surface 1d of the PD 1. This therefore leads to an increase in the S/N ratio and an improvement in the sensitivity. Additionally, this configuration avoids deterioration in the S/N ratio due to a shorter exposure time and a deterioration in the S/N ratio associated with a reduction in size of the pixel. Accordingly, high quality image in low noise can be obtained even in a solid-state image sensor that reads out at high speed such as 1000 to 10000 frames.

(2) The PD 1 passes through the bottom of the optical path region 400 and it extends to the light receiving surface side. The light shielding film 452 is formed at the bottom of the optical path region 400, such that a part of the incident light via the side surface of the PD 1 does not travel downward in the optical path region along the side surface of the PD 1 and does not enter the semiconductor region 202 where the readout circuit 300 is formed.

Noise generation due to light leakage to the readout circuit 300 can therefore be reduced even in adopting a configuration in which the light enters the PD 1 via the side surfaces of the PD 1.

(3) At least a part of the PD 1 extends toward the light receiving surface side beyond the surface in which the readout circuit 300 including the FD 8 is formed. The system of transferring the electric charge generated in the PD 1 to the FD 8 is therefore not the lateral transfer system in which the transfer is performed parallel to the surface of the semiconductor substrate. Instead, the electric charge is transferred in the signal path 4c having the component in the thickness direction of the semiconductor substrate. As a result, pixels can be reduced in size as compared with those in conventional solid-state image sensors which laterally transfer the electric charge of the PD 1 to the FD 8.

The solid-state image sensor 100 according to the first embodiment can also be described as follows.

(1) A solid-state image sensor 100 includes a semiconductor substrate 202 having a PD 1 (a light receiving unit) that receives incident light passed through a microlens 462, and a light shielding film (a light shielding unit) 452 that blocks a part of the light passed through the microlens 462 and enters (an optical path region 400 of) the semiconductor substrate 202. The PD 1 receives the incident light passed through the microlens 462, between the microlens 462 and the light shielding film 452.

(2) The PD 1 (the light receiving unit) of the solid-state image sensor 100 according to the first embodiment has a light receiving surface 1d that receives incident light enters from a direction that intersects an optical axis of the microlens 462, between the microlens 462 and the light shielding film (the light shielding unit) 452.

(3) The PD 1 (the light receiving unit) of the solid-state image sensor 100 according to the first embodiment has a plurality of light receiving surfaces 1c, 1d that receive incident light passed through the microlens 462, between the microlens 462 and the light shielding film (the light shielding unit) 452.

(4) The PD 1 (the light receiving unit) of the solid-state image sensor 100 according to the first embodiment has light receiving surfaces 1c, 1d that receive light on the light entering side in comparison with the light shielding film (the light shielding unit) 452.

(5) At least a part of the PD 1 (the light receiving unit) of the solid-state image sensor 100 according to the first embodiment protrudes beyond the light shielding film (the light shielding unit) 452 to the light entering side. In other words, at least a part of the PD 1 (the light receiving unit) is formed in a protruding shape between the bottom of the optical path region 400 and the microlens 462.

(6) The light shielding film (the light shielding unit) 452 of the solid-state image sensor 100 described in (5) above has an opening 452A that is a region the PD 1 passing through, and at least a part of the PD 1 (the light receiving unit) protrudes beyond the light shielding film (light shielding unit) 452 through the opening 452A to the light entering side.

(7) The semiconductor substrate 202 of the solid-state image sensor 100 described in (1) to (4) above has the optical path region (a waveguide) 400, between the microlens 462 and the light shielding film (the light shielding) 452, which allows the light passed through the microlens 462 to enter the PD1 (the photoelectric conversion unit).

(8) The optical path region (the waveguide) 400 of the solid-state image sensor 100 described in (5) above allows light passed through the microlens 462 and blocked by the light shielding film (the light shielding unit) 452 to enter the PD 1 (the photoelectric conversion unit).

(9) The light shielding film (the light shielding unit) 452 of the solid-state image sensor 100 described in (7) and (8) above has an opening 452A that is a region through which the PD 1 passes through, and the optical path region (the waveguide) 400 is provided between the microlens 462 and the opening 452A.

(10) At least a part of the light receiving unit of the solid-state image sensor 100 according to the first embodiment has a photoelectric conversion unit that photoelectrically converts the received light to generate an electric charge.

The solid-state image sensor 100 according to the first embodiment also includes a floating diffusion (an accumulation unit) 8 that accumulates the electric charge generated by the photoelectric conversion unit, and a transfer transistor (a transfer unit) 4 that transfers the electric charge generated by the photoelectric conversion unit to the floating diffusion (the accumulation unit) 8. The transfer transistor (the transfer unit) 4 is provided between the photoelectric conversion unit and the floating diffusion (the accumulation unit) 8 in a direction of the optical axis of the microlens 462.

In the solid-state image sensor 100 according to the first embodiment, the arrow 4*c* illustrated in FIG. 3 is a transfer path that transfers the electric charge generated by the photoelectric conversion unit to the floating diffusion (the accumulation unit) 8.

Second Embodiment

The solid-state image sensor according to a second embodiment will now be explained with reference to FIGS. 4 to 8.

The second embodiment differs from the first embodiment in that:

(1) a solid-state image sensor 100A is formed using a SOI substrate 500;

(2) a FD 8 is arranged directly under a substrate front surface side of a PD 1;

(3) the PD 1, the FD 8, a transfer circuit, and a reset circuit are formed on one substrate and an amplification transistor 11 is formed on the other substrate;

(4) the FD 8 is directly connected to a back gate electrode of the amplification transistor 11 without wiring;

(5) a predetermined potential (for example, a reference potential Vdd) is applied to a top gate electrode of the amplification transistor 11;

(6) a light shielding film at the bottom of a light path region is composed of a transfer wiring 4H of the transfer transistor 4; and (7) a selection transistor 12 is provided on other substrate.
Outline of Element Pattern of Pixel 20

FIG. 4(*a*) is a cross-sectional view illustrating a part of an element pattern of a pixel 20A in a solid-state image sensor 100A. The same parts as those in FIG. 3 are denoted by the same reference signs, and a detailed description thereof will be omitted.

The solid-state image sensor 100A is formed on the SOI semiconductor substrate 500. The semiconductor substrate 500 has a first semiconductor substrate 501 and a second semiconductor substrate 502 integrated together by a buried oxide layer 503.

The first semiconductor substrate 501 is provided with vertically elongated PDs 1 that extend in a thickness direction (an incident light direction) of the substrate, a transfer circuit including a transfer transistor 4, a FD 8, and a reset circuit including a reset transistor 13.

The second semiconductor substrate 502 is provided with an amplification circuit including an amplification transistor 11, a through hole wiring 502H of a GND terminal connecting an anode of the PD 1 to a ground potential, and a through hole wiring 502H connecting a drain of the reset transistor 13 and a drain of the amplification transistor 11 to a predetermined potential (e.g., a reference potential Vdd). The second semiconductor substrate 502 field isolates elements by a STI 51.

Reference sign 4H denotes a transfer wiring that applies a gate voltage to a gate electrode 4*g* of the transfer transistor 4. Reference sign 13*g* denotes a gate electrode of the reset transistor 13, and the gate electrode 13*g* is supplied with a reset voltage from a reset gate wiring (not shown).
Equivalent Circuit of Pixel 20

FIG. 4(*b*) is a view illustrating an equivalent circuit of the pixel 20 corresponding to FIG. 4(*a*).

This equivalent circuit differs from the equivalent circuit of the first embodiment illustrated in FIG. 2 in that:

the FD 8 is connected to the back gate electrode of the amplification transistor 11; a predetermined potential (e.g., a reference potential Vdd) is applied to the top gate electrode; and a selection circuit including the selection transistor 12 is provided on other substrate.
Detailed Description of Solid-State Image Sensor 100A The solid-state image sensor 100A according to the second embodiment will be explained in detail also with reference to FIGS. 5 to 8.

Figure 5:
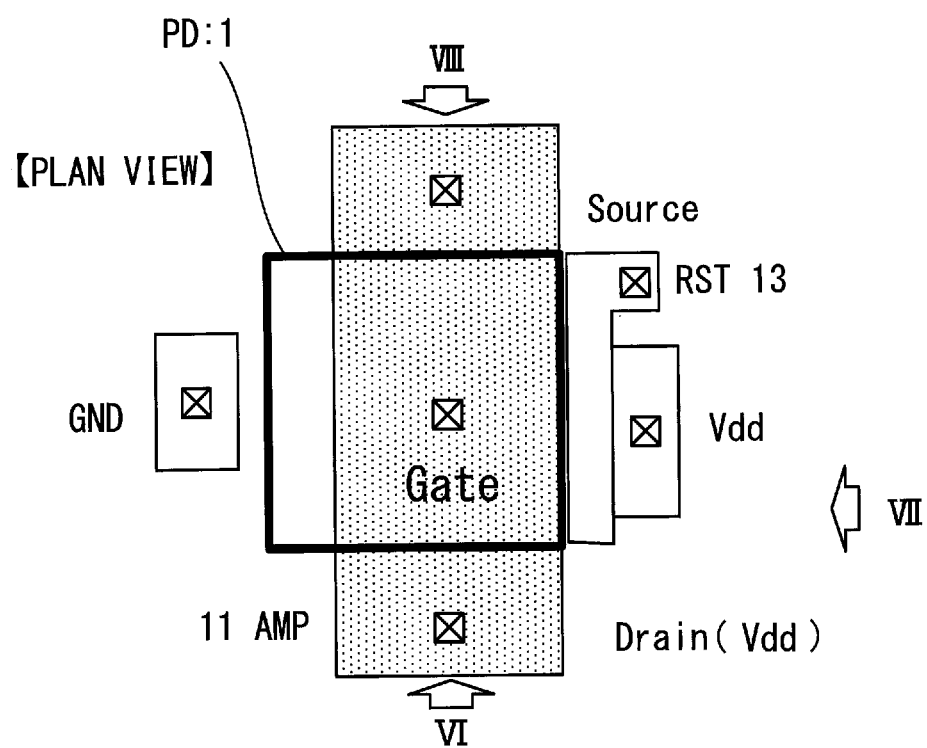
FIG. 5 is a plan view of a solid-state image sensor 100 according to the second embodiment.
Figure 6:
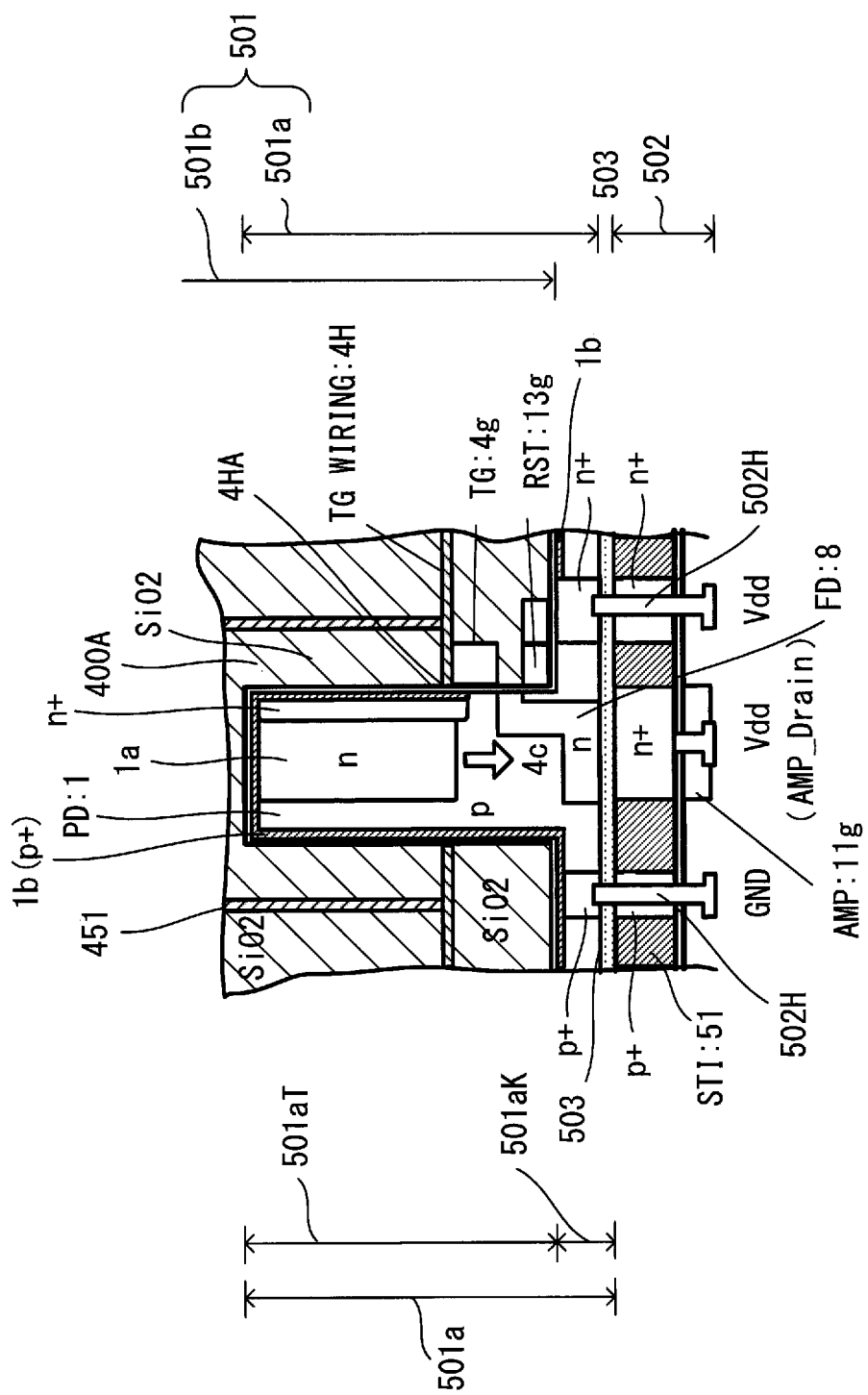
FIG. 6 is a cross-sectional view of the pixel 20 of the second embodiment as seen in VI direction.
Figure 7:
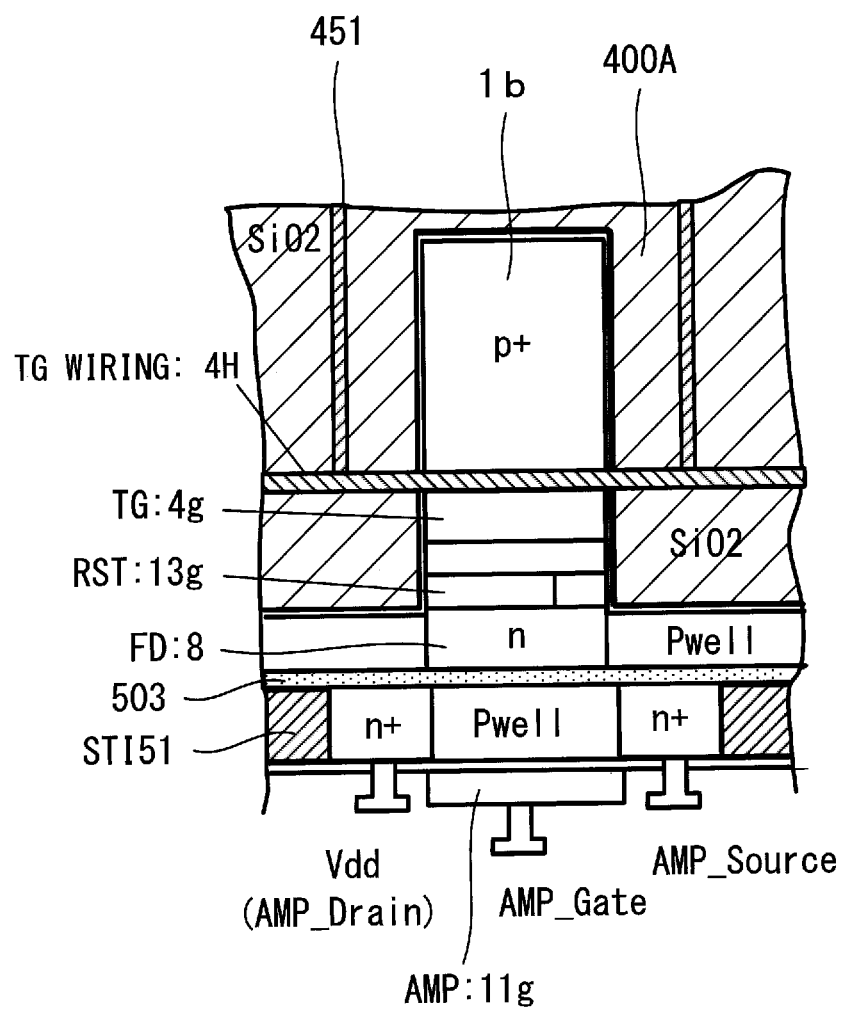
FIG. 7 is a cross-sectional view of the pixel 20 of the second embodiment as seen in VII direction.
Figure 8:
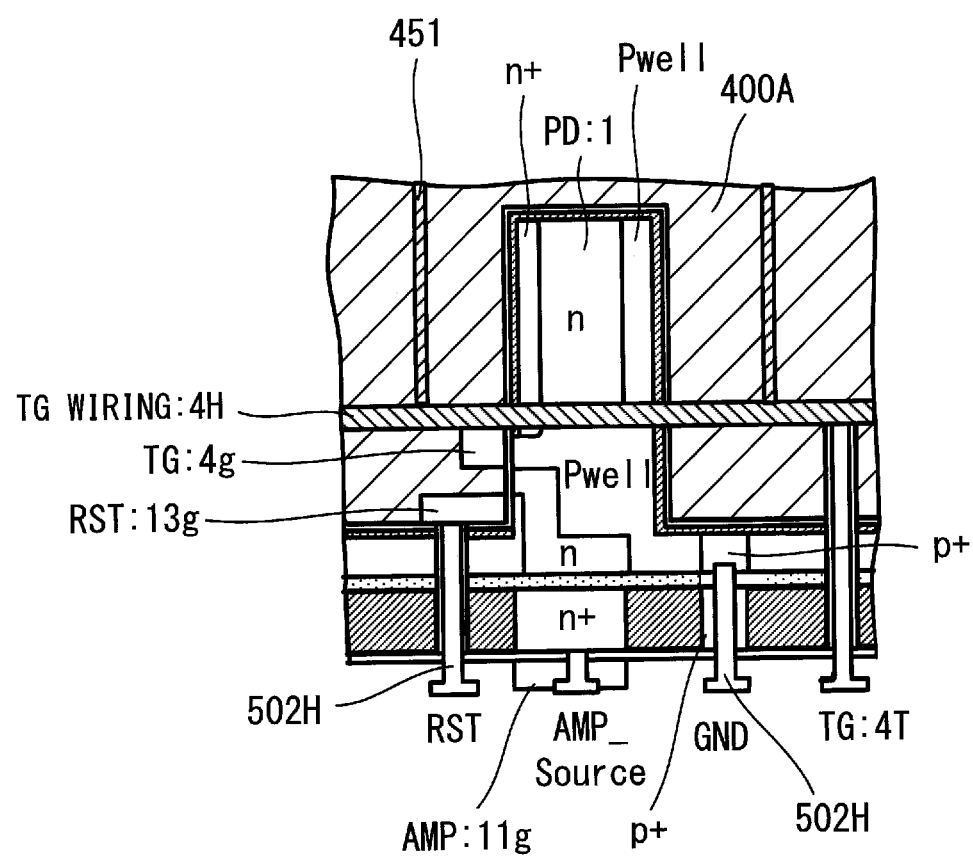
FIG. 8 is a cross-sectional view of the pixel 20 of the second embodiment as seen in VIII direction.

FIG. 5 illustrates a planar structure of a pixel 20 of the solid-state image sensor 100A according to the second embodiment and FIG. 6 is a vertical cross-sectional view as seen from a direction indicated by an arrow VI in FIG. 5. FIG. 7 is a vertical cross-sectional view as seen from a direction indicated by an arrow VII in FIG. 5. FIG. 8 is a vertical cross-sectional view as seen from a direction indicated by an arrow VIII in FIG. 5.
First Semiconductor Substrate 501

A first semiconductor substrate 501 will be explained with reference to FIG. 6.

The first semiconductor substrate 501 includes a semiconductor region 501*a* in which a part corresponding to the PD 1 extends toward a light receiving surface side. The semiconductor region 501*a* has a base region 501*a*K shaped as a thin layer and a protruding region 501*a*T in which the PD 1 extends from the base region 501*a*K toward the light receiving surface side. The PD 1 is formed in the protruding region 501*a*T by selectively implanting an n-type impurity or a p-type impurity into a predetermined part of the p-type semiconductor region 501*a*. The same impurity implantation is performed for the base region 501*a*K to form the transfer circuit including the transfer transistor 4, the FD 8, and the reset circuit including the reset transistor 13.
Semiconductor Region 501*a*

Referring to FIG. 6, the base region 501*a*K of the semiconductor region 501*a*, which is shaped as a thin layer, is provided with a p+ contact region that is connected to a GND terminal via a through hole and an n+ contact region that is connected to a reference potential terminal Vdd via a through hole. An anode of the PD 1 and the p+ surface region 1*b* are fixed to a GND potential via the p+ contact region. A drain of the reset transistor 13 and a drain of the amplification transistor 13 are connected to a reference potential terminal Vdd via the n+ contact region.

The first semiconductor substrate 501 has an oxide film 501*b* provided on the light receiving surface side of the semiconductor region 501*a*. The oxide film 501*b* is formed in regions other than a protruding region 501*a*T of the semiconductor region 501*a* and an optical path region 400A formed on an outer periphery of the PD 1.

A transfer wiring 4H is formed in the oxide film 501*b* in such a manner that the transfer wiring 4H traverses the PD 1 which is a protrusion of the semiconductor region 501a. The oxide film 501b is also provided with an optical path region 400A having a rectangular cross section and surrounding the outer periphery of the PD 1 having a protruding shape, in a region that is closer to the light receiving surface with respect to the transfer wiring 4H.

The transfer wiring 4H is formed to traverse the optical path region 400A so that light entering the optical path region 400A would not travel downward in FIG. 4 (i.e., toward a side opposite to the light receiving surface). This configuration therefore has the same function as that of the light shielding film 452 described in FIG. 3, which eliminates the need for a dedicated light shielding film 452.

As in the first embodiment, the PD 1 is a buried photodiode having a photoelectric conversion region 1a and a surface region 1b. The p+ region in the surface region 1b prevents a depletion layer of the photoelectric conversion region 1a from reaching the surface. This prevents a dark current generated at a semiconductor interface from flowing to the photoelectric conversion region 1a.

Detailed Description of PD 1 and FD 8

A configuration of the PD 1 and the FD 8 will be explained in detail with reference to FIGS. 6 to 8.

In a predetermined region on the top surface side of the protruding region 501aT of the semiconductor substrate 501a, that is, in a p-type region that is closer to the light receiving surface with respect to the transfer wiring 4H, an n-type impurity is implanted at an appropriate concentration to form the PD 1 having a p-n junction. In FIG. 6, the PD 1 is provided with an n region and an n+ region.

The FD 8 is formed by implanting an n-type impurity in a boundary region between the semiconductor substrate base region 501aK and the protruding region 501aT. In FIG. 6 as seen from the VI direction in FIG. 5, the FD 8 is illustrated to have an L shape for convenience. The PD 1 has the same shape as in the first embodiment. At least a part of the PD 1 has a shape that is protruding toward the incident light direction. In other words, at least a part of the PD 1 passes through the opening 4 HA of the transfer wiring 4H and extends toward the incident light side and is closer to the light receiving surface with respect to the transfer wiring 4H. It should be noted that at least a part of the PD 1 may extend toward the incident light side beyond the reflection film 450 or the opening 401.

An n-type region in an upper end of the FD 8 faces an n region of the PD 1 via a p-type region. In this facing region, the transfer gate electrode 4g of polysilicon for controlling this channel is formed in the oxide film 501b on the outer periphery of the protruding region 501aT in order to flow a detection current based on the electric charge accumulated in the PD 1. The transfer gate electrode 4g is connected to the transfer wiring 4H. The transfer wiring 4H is connected to a TG terminal 4T which passes through a through hole, as illustrated in FIG. 8. When the TG terminal 4T is supplied with a transfer gate signal, the transfer transistor 4 transfers the electric charge of the PD 1 to the FD 8.

Furthermore, a lower part (a side opposite to the light receiving surface side) of the FD 8 covers the channel part of the amplification transistor 11 via the buried isolation layer 503 and serves as a back gate electrode.

A reset gate electrode 13g of polysilicon is formed in the oxide film 501b below the transfer gate electrode 4g. As illustrated in FIG. 8, the reset gate electrode 13g is connected to a reset gate terminal RST via a through hole wiring 502H passing through the first semiconductor substrate 501 and the second semiconductor substrate 502.

The transfer transistor 4 allows a detection current based on the electric charge generated in the PD 1 to flow in a direction as indicated by an arrow 4C (see FIG. 6) having a component in a thickness direction of the surface of the semiconductor substrate. The FD 8 serves as a back gate electrode of the amplification transistor 11. A predetermined potential (e.g., a reference potential Vdd) is connected to a top gate electrode 11g of the amplification transistor 11. The potential of the FD 8 varies and the amplification transistor 11 accordingly amplifies the voltage of the FD 8. The voltage amplified by the amplification transistor 11 is supplied to a selection transistor 12 (not shown) and outputted as a pixel signal from a vertical signal line by a lateral transfer system in which the transfer is performed along the substrate surface.

Conventionally, the detection current based on the electric charge generated in the PD 1 flows in a direction along the surface of the semiconductor substrate. Contrastingly, in the solid-state image sensor 1 according to the first embodiment, the signal path from the PD 1 to the FD 8 is the path having the component in the thickness direction of the substrate. Accordingly, the size of the transfer transistor 4 in the in-plane direction of the substrate can be reduced. A reduction in size of the pixel can thus be achieved.

The solid-state image sensor 100A according to the second embodiment can achieve the similar advantageous effects as those of the first embodiment.

In other words, the solid-state image sensor 100A according to the second embodiment includes a semiconductor substrate 500 having a PD 1 (a light receiving unit) that receives incident light passed through a microlens 462, and a TG wiring (a light shielding unit) 4H that blocks a part of the light passed through the microlens 462 and enters the semiconductor substrate 500. The PD 1 receives incident light passed through the microlens 462, between the microlens 462 and the TG wiring (the light shielding unit) 4H.

At least a part of the PD 1 (the light receiving unit) of the solid-state image sensor 100A according to the second embodiment has a photoelectric conversion unit that photoelectrically converts the received light to generate an electric charge.

The solid-state image sensor 100A according to the second embodiment also includes a floating diffusion (an accumulation unit) 8 that accumulates the electric charge generated by the photoelectric conversion unit, and a transfer transistor (a transfer unit) 4 that transfers the electric charge generated by the photoelectric conversion unit to the floating diffusion (the accumulation unit) 8. The transfer transistor (the transfer unit) 4 is arranged between the photoelectric conversion unit and the floating diffusion (the accumulation unit) 8 in a direction of an optical axis of the microlens 462. Referring to FIG. 6, the transfer transistor 4 allows a detection current based on the electric charge generated in the PD 1 to flow in a direction as indicated by an arrow 4C (see FIG. 6) having a component in a thickness direction of the surface of the semiconductor substrate.

In the solid-state image sensor 100A according to the second embodiment, the arrow 4c illustrated in FIG. 6 is a transfer path that transfers the electric charge generated by the photoelectric conversion unit to the floating diffusion (the accumulation unit) 8.

Additionally, the following advantageous effects can be obtained.

(1) Disposing the FD 8 directly under the PD 1 enables the pixels to be mounted with high density.

(2) The FD 8 disposed directly under the PD 1 serves as a back gate electrode of the amplification transistor 11 without wiring, so that the capacitance of the FD 8 can be reduced and a conversion gain can be increased.

(3) The dedicated light shielding film 452, which is required in the first embodiment, is unnecessary since the light shielding at the bottom of the optical path region is performed by the transfer wiring 4H.

The second embodiment described above may be modified as follows.

First Variation of Second Embodiment

Figure 9:
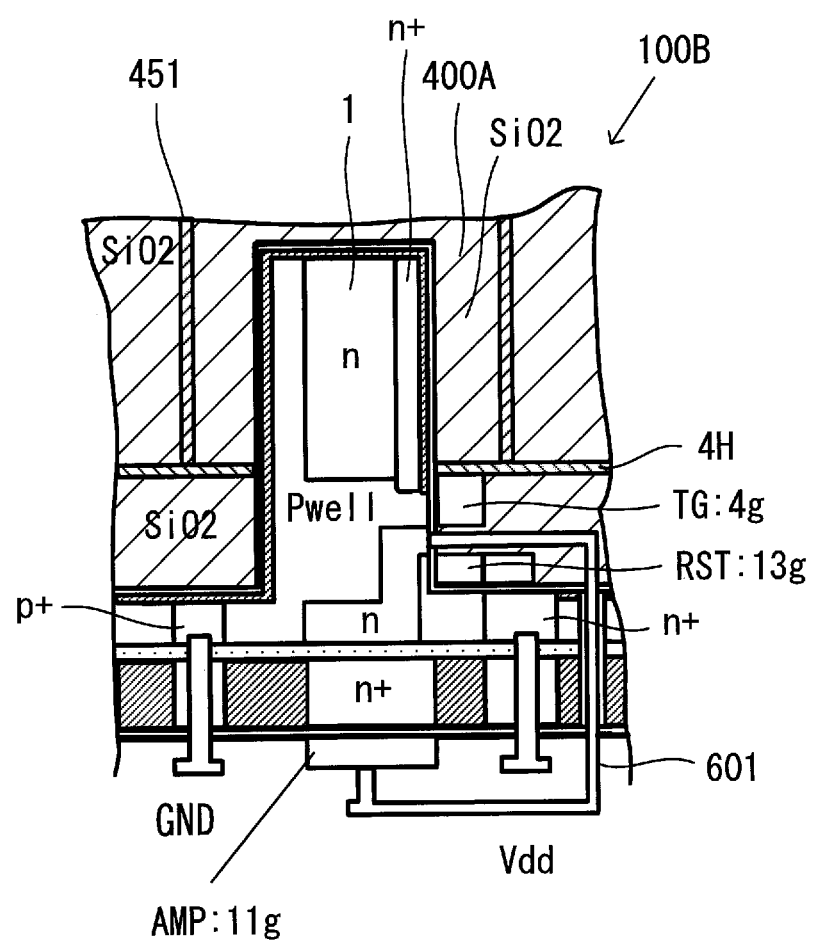
FIG. 9 is a cross-sectional view corresponding to FIG. 6, illustrating a first variation of the second embodiment.
Figure 10:
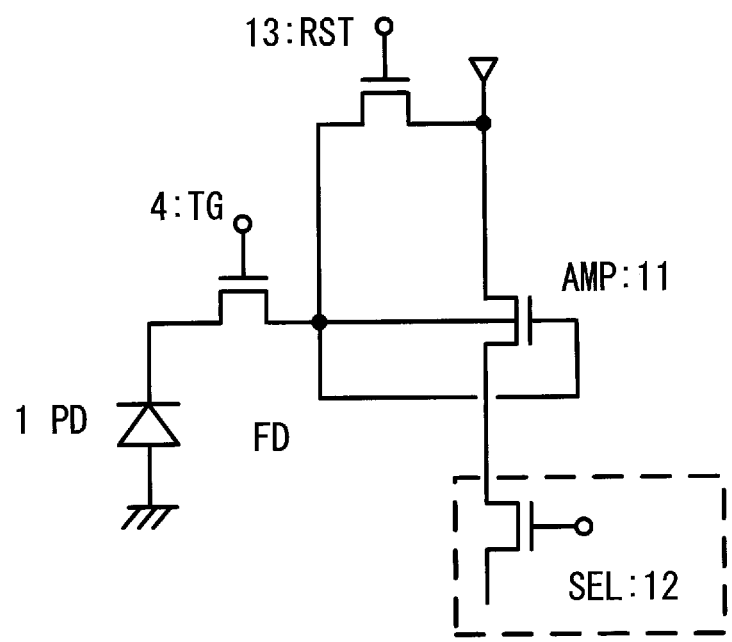
FIG. 10 is a view illustrating an equivalent circuit of the first variation of the second embodiment.

FIG. 9 is a view illustrating a configuration of a solid-state image sensor 100B according to a first variation of the second embodiment, and it corresponds to FIG. 6 for the second embodiment. FIG. 10 is a view illustrating an equivalent circuit of the solid-state image sensor 100B in FIG. 9 and it corresponds to FIG. 4(*b*) for the second embodiment. The same parts as those in FIGS. 6 and 4(*b*) are denoted by the same reference signs, and differences will be mainly described.

In the solid-state image sensor 100A in FIG. 6, the FD 8 is connected to the back gate electrode of the amplification transistor 11 without wiring, and the predetermined potential (e.g., the reference potential Vdd) is applied to the top gate electrode 11g. Contrastingly, in the solid-state image sensor 100B in FIG. 9, the FD 8 is connected to the top gate electrode 11g of the amplification transistor 11 with a wiring 601. This makes that gate drive signals having the same potential are inputted to the back gate electrode and the top gate electrode 11g of the amplification transistor 11.

The solid-state image sensor 100B according to the first variation of the second embodiment can also achieve similar advantageous effects as those of the second embodiment.

The solid-state image sensor 100B according to the first variation of the second embodiment also achieves the following advantageous effects since gate drive signals having the same potential originating from the FD 8 are inputted to both the back gate electrode and the top gate electrode of the amplification transistor 11.

(1) In the second embodiment, it is required that the predetermined potential (e.g., the reference potential Vdd) is applied to the top gate electrode at an electric charge readout timing, and it leads to a complicated circuit configuration. Inputting the gate drive signals originating from the FD 8 to the top gate electrode and the back gate electrode eliminates the need for such a timing circuit and thus achieves a simplification of the circuit.

Second Variation of Second Embodiment

Figure 11:
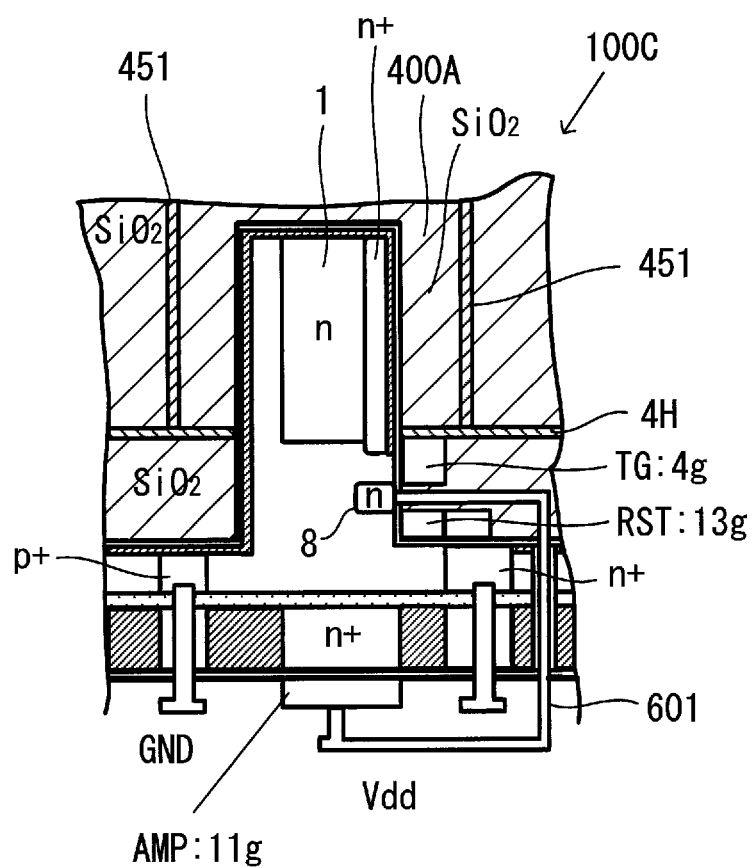
FIG. 11 is a cross-sectional view corresponding to FIG. 6, illustrating a second variation of the second embodiment.
Figure 12:
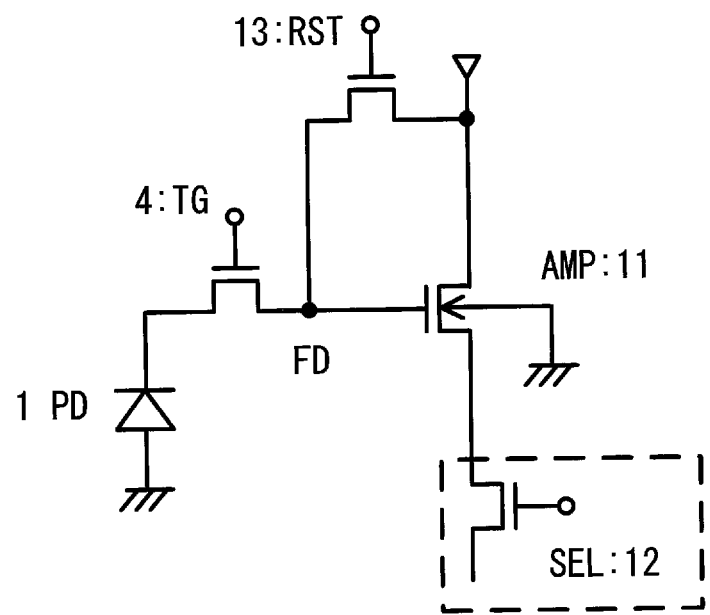
FIG. 12 is a view illustrating an equivalent circuit of the second variation of the second embodiment.

FIG. 11 is a view illustrating a configuration of a solid-state image sensor 100C according to a second variation of the second embodiment, and it corresponds to FIG. 9 for the first variation of the second embodiment. FIG. 12 is a view illustrating an equivalent circuit of the solid-state image sensor 100C in FIG. 11 and it corresponds to FIG. 4(*b*) for the second embodiment. The same parts as those in FIGS. 9 and 4(*b*) are denoted by the same reference signs, and differences will be mainly described.

In the solid-state image sensor 100A in FIG. 6, the FD 8 is connected to the back gate electrode of the amplification transistor 11 without wiring, and the predetermined potential (e.g., the reference potential Vdd) is applied to the top gate electrode. Contrastingly, in the solid-state image sensor 100C of FIG. 11, the potential of the back gate electrode of the amplification transistor 11 is set to the GND potential of the p region.

The solid-state image sensor 100C according to the second variation of the second embodiment can also achieve similar advantageous effects as those of the second embodiment.

Third Variation of Second Embodiment

Figure 13:
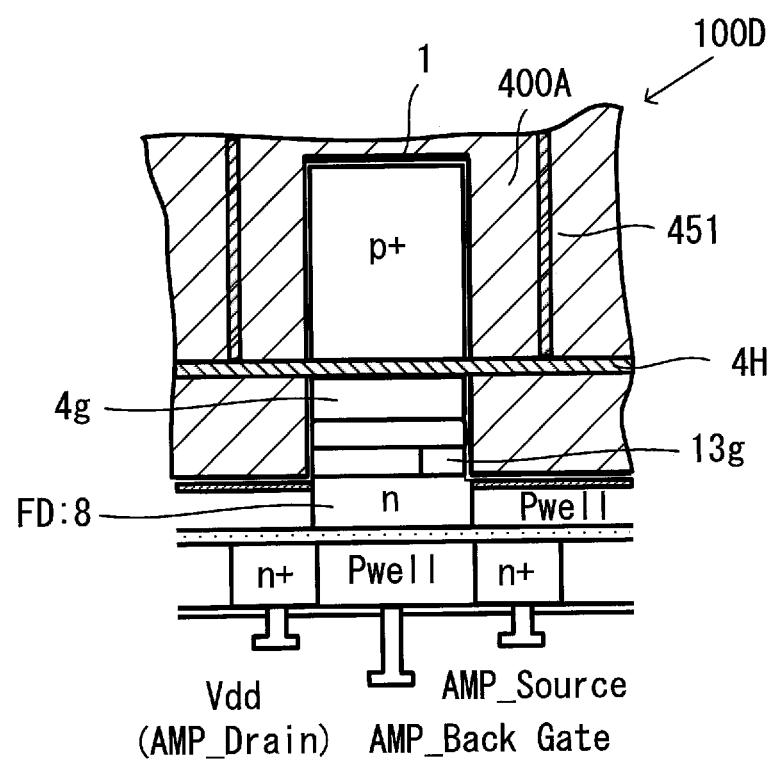
FIG. 13 is a cross-sectional view corresponding to FIG. 7, illustrating a third variation of the second embodiment.

FIG. 13 is a view illustrating a configuration of a solid-state image sensor 100D according to a third variation of the second embodiment, and it corresponds to FIG. 7 for the second embodiment. An equivalent circuit of the solid-state image sensor 100D in FIG. 13 is illustrated in FIG. 12. The same parts as those in FIGS. 7 and 4(*b*) are denoted by the same reference signs, and differences will be mainly described.

In the solid-state image sensor 100A in FIG. 6, the FD 8 is connected to the back gate electrode of the amplification transistor 11 without wiring, and the predetermined potential (e.g., the reference potential Vdd) is applied to the top gate electrode 11g. Contrastingly, in the solid-state image sensor 100D in FIG. 13, the top gate electrode of the amplification transistor 11 is connected to the FD 8 without wiring, and the back gate electrode of the amplification transistor 11 directly connects the GND terminal to the p region. In other words, the structure of the back gate electrode is not a so-called MOS structure.

The solid-state image sensor 100D according to the third variation of the second embodiment can also achieve similar advantageous effects as those of the second embodiment.

Third Embodiment

Figure 14:
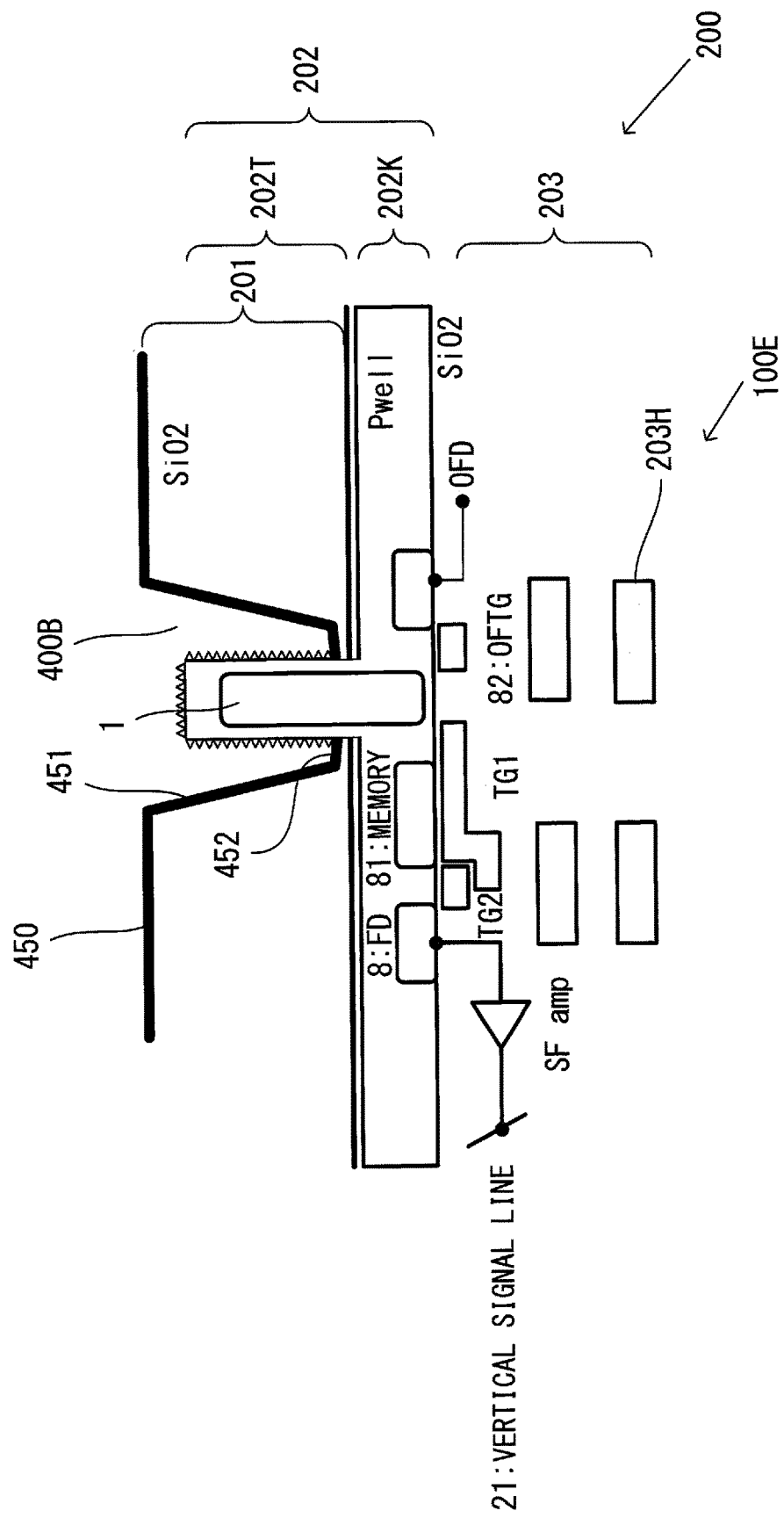
FIG. 14 is a cross-sectional view of a pixel 20 of a third embodiment.

FIG. 14 is a view illustrating a configuration of a solid-state image sensor 100E according to a third embodiment, and it corresponds to FIGS. 2 and 3 for the first embodiment. The same parts as those in FIGS. 2 and 3 are denoted by the same reference signs, and differences will be mainly described.

The solid-state image sensor 100E according to the third embodiment is an element that achieves a so-called global shutter and includes a memory for storing a pixel signal for each pixel.

The solid-state image sensor 100E is formed in one single semiconductor substrate 200. A FD 8, a memory 81, and an overfloating gate 82 are formed in a semiconductor base 202K which is a thin layer. A TG 1 and a TG 2 are gate electrodes of the transfer gate that transfers the electric charge of the PD 1 to the memory 81 and the FD 8. The transfer gate electrode TG2 is formed to overlap the gate electrode TG1, which can prevent light from entering the readout circuit.

Additionally, the optical path region 400B on the outer periphery of the PD 1 formed in the protruding semiconductor region 202T is shaped as a pyramid, instead of the prism. The optical path region 400B forms a mortar-shaped light incident region that is recessed from the light receiving surface. The optical path region 400B is hollow.

As in the first embodiment, a material having a high visible light transmittance such as SiO2 or the like may be deposited on the optical path region 400B.

For a monochrome solid-state image sensor, color filters are not necessary. The light shielding film 450 on the light receiving surface of the oxide film 201, the peripheral reflection film 451 of the optical path region 400, and the light shielding film 452 on the bottom surface of the optical path region 400 may be made of the same material, instead of different materials.

The solid-state image sensor 100E according to the third embodiment can also achieve similar advantageous effects as those of the first embodiment.

Fourth Embodiment

Figure 15:
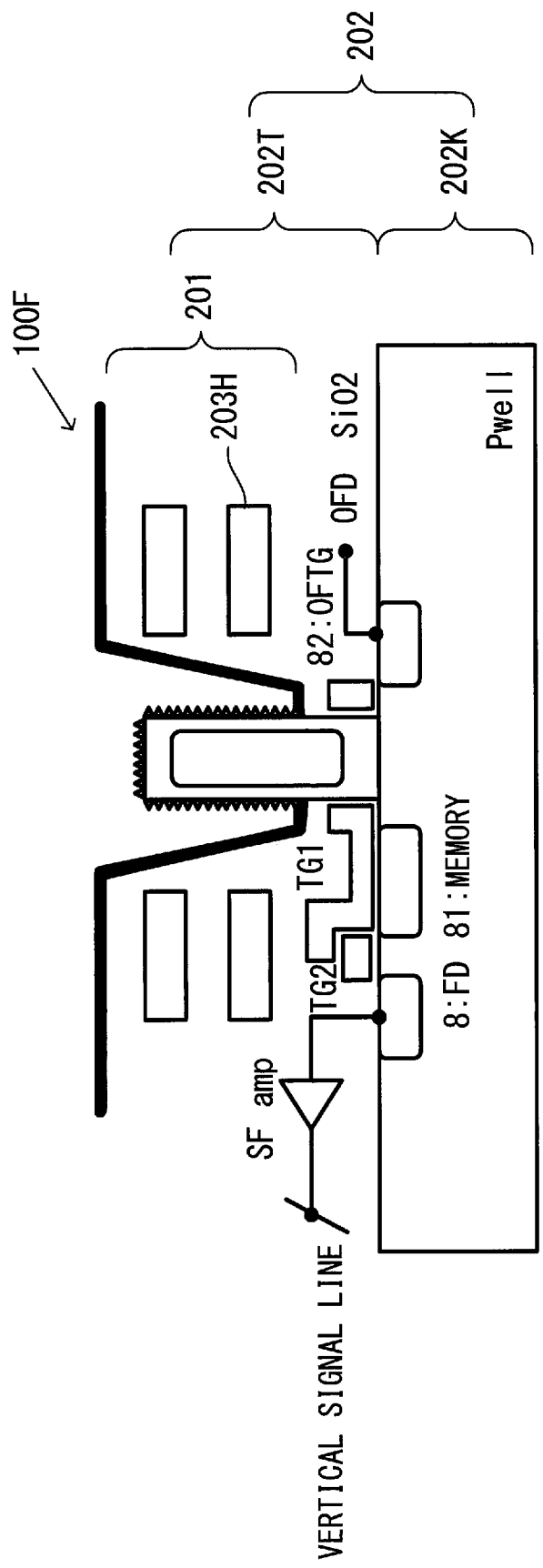
FIG. 15 is a cross-sectional view of a pixel 20 of a fourth embodiment.

FIG. 15 is a view illustrating a configuration of a solid-state image sensor 100F according to a fourth embodiment, and it corresponds to FIG. 14 for the third embodiment. The same parts as those in FIG. 14 are denoted by the same reference signs, and differences will be mainly described.

The solid-state image sensor 100E according to the third embodiment is a so-called back illumination type element. The solid-state image sensor 100F according to the fourth embodiment is a front illumination type element in which a wiring region is arranged on the light receiving surface side. The wiring 203H is formed in a region further outside of the optical path region 400, that is, the oxide film 201 on the light receiving surface side. Other parts of the configuration are the same as those in the third embodiment and an explanation thereof will thus be omitted.

The solid-state image sensor 100F according to the fourth embodiment can also achieve similar advantageous effects as those of the first embodiment.

Fifth Embodiment

Figure 16:
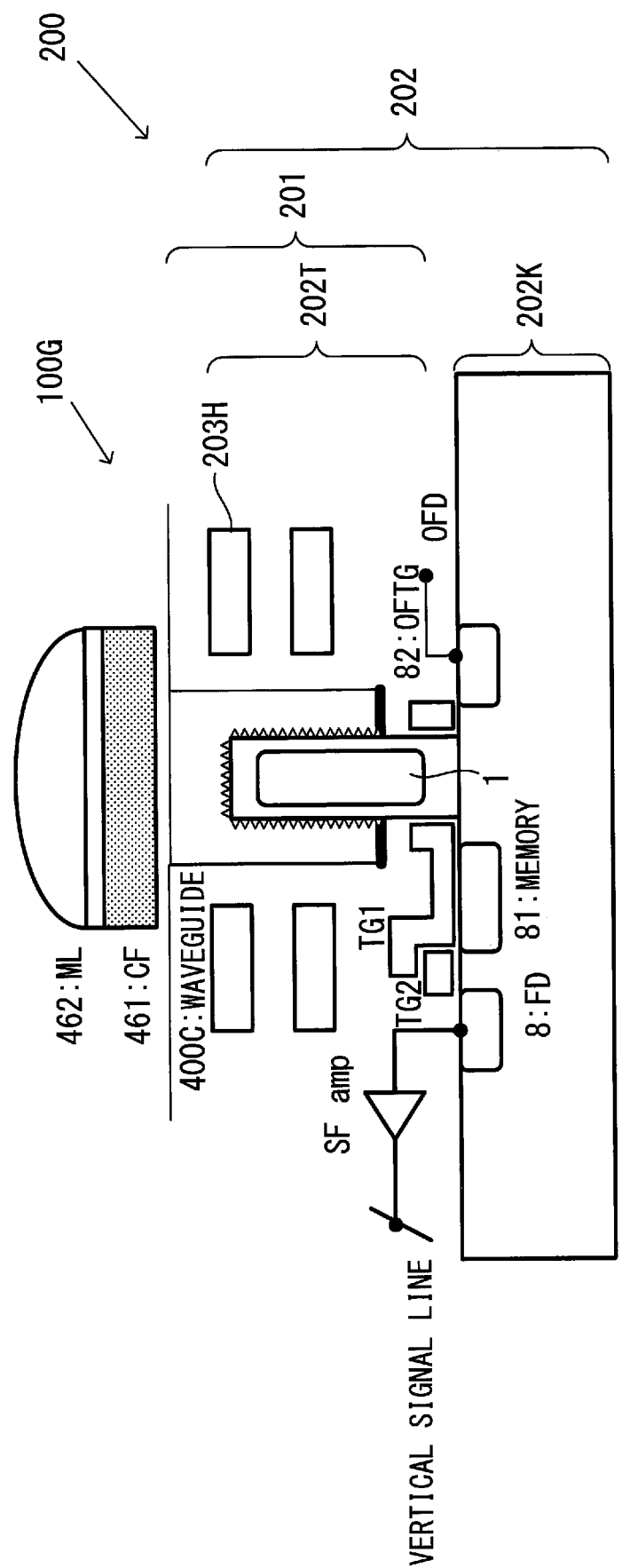
FIG. 16 is a cross-sectional view of a pixel 20 of a fifth embodiment.

FIG. 16 is a view illustrating a configuration of a solid-state image sensor 100G according to a fifth embodiment, and it corresponds to FIG. 15 for the fourth embodiment.

The same parts as those in FIG. 15 are denoted by the same reference signs, and differences will be mainly described.

The solid-state image sensor 100G according to the fifth embodiment is also a front illumination type element in which a wiring region is arranged on the light receiving surface side. The solid-state image sensor 100G differs from the solid-state image sensor 100F according to the fourth embodiment in the shape of the optical path region formed on the outer periphery of the vertically elongated PD 1.

The solid-state image sensor 100G according to the fifth embodiment is formed in one single semiconductor substrate. AFD 8, a memory 81, and an overfloating gate 82 are formed in a semiconductor base 202K which is a thin layer. Additionally, instead of the optical path region 400B, a prismatic optical waveguide 400C having a rectangular cross section is formed on the outer periphery of the PD 1 formed in the protruding semiconductor region 202T.

The solid-state image sensor 100G according to the fifth embodiment can also achieve similar advantageous effects as those of the first embodiment.

Each of the embodiments described above may be modified and used in the following manner.

A variation of a solid-state image sensor described below is intended to enhance a sensitivity for each color and to improve a separability.

An internal quantum efficiency of an image sensor generally depends on a light absorption depth determined by a position at which a photodiode is formed and a wavelength of light. In a front illumination type pixel in which a photodiode is formed on a silicon front surface side, the internal quantum efficiency is higher for light having a shorter wavelength and it is lower for light having a longer wavelength. Contrastingly, in a back illumination type pixel, since a photodiode is formed in a deep region of the silicon substrate, the internal quantum efficiency is higher for light having a longer wavelength and it is lower for light having a shorter wavelength.

If the photodiode could be formed at an optimal depth for each wavelength, instead of the photodiode formed at a certain fixed depth, the internal quantum efficiency could be enhanced for both front illumination type and back illumination type. However, it has been conventionally difficult to create such a configuration since a complete transfer would be difficult with a photodiode formed in a deep region of a silicon substrate.

Additionally, an image sensor having an image plane phase difference detection function generally has two photodiodes in a pixel, which are divided to each other by a P-type isolation. In order to vary the photodiode depth for different wavelengths as described above, it is necessary to form the P-type isolation at the same depth. It is however difficult to form a satisfactory P-type isolation structure in a deep region of the silicon. If the P-type isolation is insufficient in the deep region of the silicon, the separability deteriorates for light having a longer wavelength in the front illumination type element and contrastingly for light having a shorter wavelength in the back illumination type element.

A solid-state image sensors having a configuration according to each of the following variations improves the sensitivity by forming a photodiode at a depth depending on a light wavelength by adopting a vertical transfer gate structure, and also improves the separability by adjusting a photodiode aperture ratio.

First Variation

The first to fifth embodiments has a fixed depth position of the PD from the light receiving surface, irrespective of wavelength-selected light. In a first variation, the depth position of the PD from the incident surface (the light receiving surface) is a position depending on wavelength-selected light, that is, a position depending on a RGB pixel. Additionally, in the first variation, a vertical transfer gate structure is employed to transfer the electric charge from the PD to the FD.

In eEach of the solid-state image sensors 100H to 100K in FIGS. 17 to 20, each PD 1 is arranged at a depth depending on each wavelength of R, and B and the electric charge of the PD 1 is transferred to the FD 8 via a vertical transfer gate FD 61R, 61G or 61B.

Figure 17:
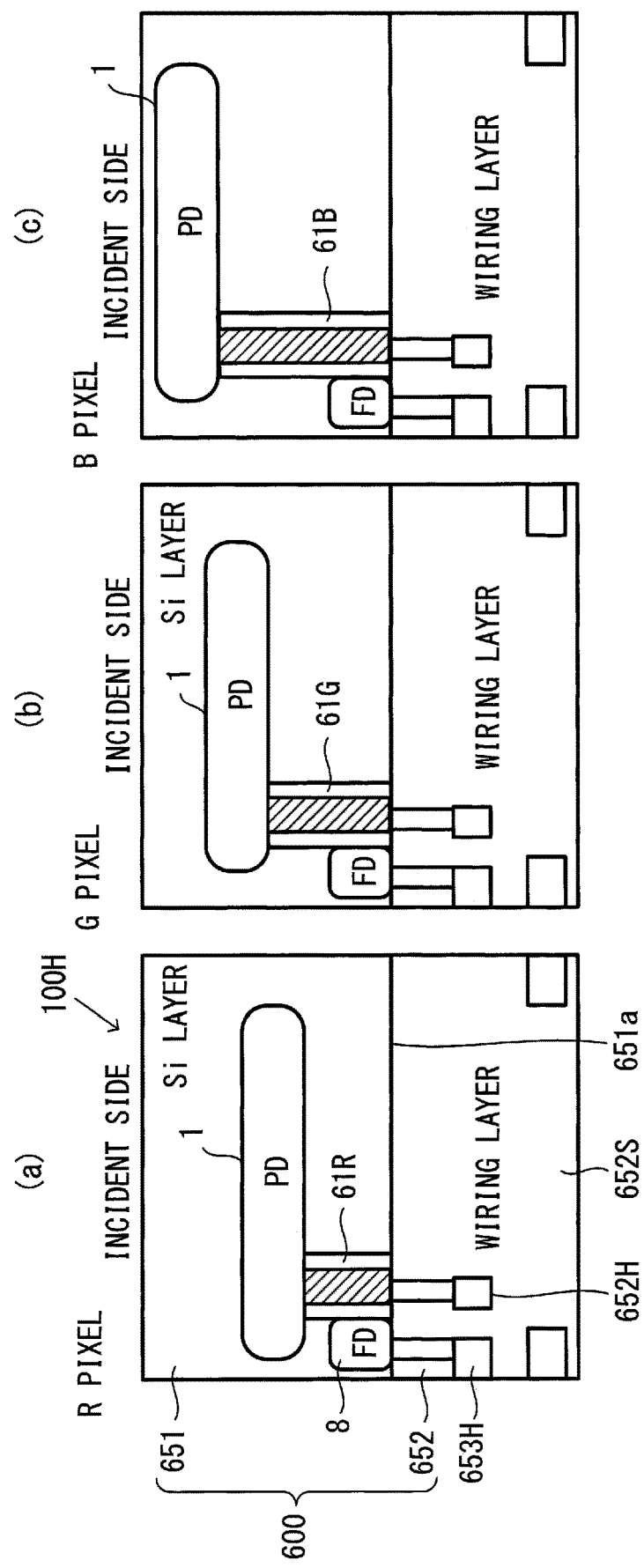
FIG. 17 is a cross-sectional view illustrating a variation of the first to fifth embodiments, illustrating only main components of the pixel 20 used for a back illumination type element.

The solid-state image sensor 100H in FIG. 17 has RGB pixels formed in a Bayer array or the like on a semiconductor substrate 600 including a Si layer 651 and a wiring region 652.

For example, in a front illumination type pixel having color filters arranged in a Bayer array, photodiodes are formed at deep positions of a silicon layer in the order of R pixel, G pixel, and B pixel, and gate lengths of the vertical transfer gates 61R, 61G and 61B vary accordingly. Contrastingly, in a back illumination type pixel, the photodiode is formed in depth of the order of B pixel, G pixel, and R pixel, and gate lengths are determined according to htem.

Specifically, in the Si layer 651 of the R pixel, the PD 1 is formed at a first depth position from the surface of the Si layer 651 and the FD 8 is formed on the surface of the Si layer 651. In the Si layer 651 of the G pixel, the PD 1 is formed at a second depth position from the surface of the Si layer 651 and the FD 8 is formed on the surface of the Si layer 651. In the Si layer 651 of the B pixel, the PD 1 is formed at a third depth position from the surface of the Si layer 651 and the FD 8 is formed on the surface of the Si layer 651. Here, the first depth position<the second depth position<the third depth position.

In each RGB pixel, the vertical transfer gate 61R, 61G; or 61B (hereinafter representatively referred to as 61) is provided in the Si layer 651 to transfer the electric charge between the PD 1 and the FD 8. For the gate length, the transfer gate 61R< the transfer gate 61G< the transfer gate 61B.

The wiring region 652 is provided with a wiring 652H for inputting a gate control signal to the vertical transfer gate 61. The wiring region 652H is also provided with a wiring 653H for transferring the potential of the FD 8 to an amplification transistor (not shown). It should be noted that the region except for the wiring region 652 is constituted with an oxide film 652S of SiO2 or the like.

Figure 18:
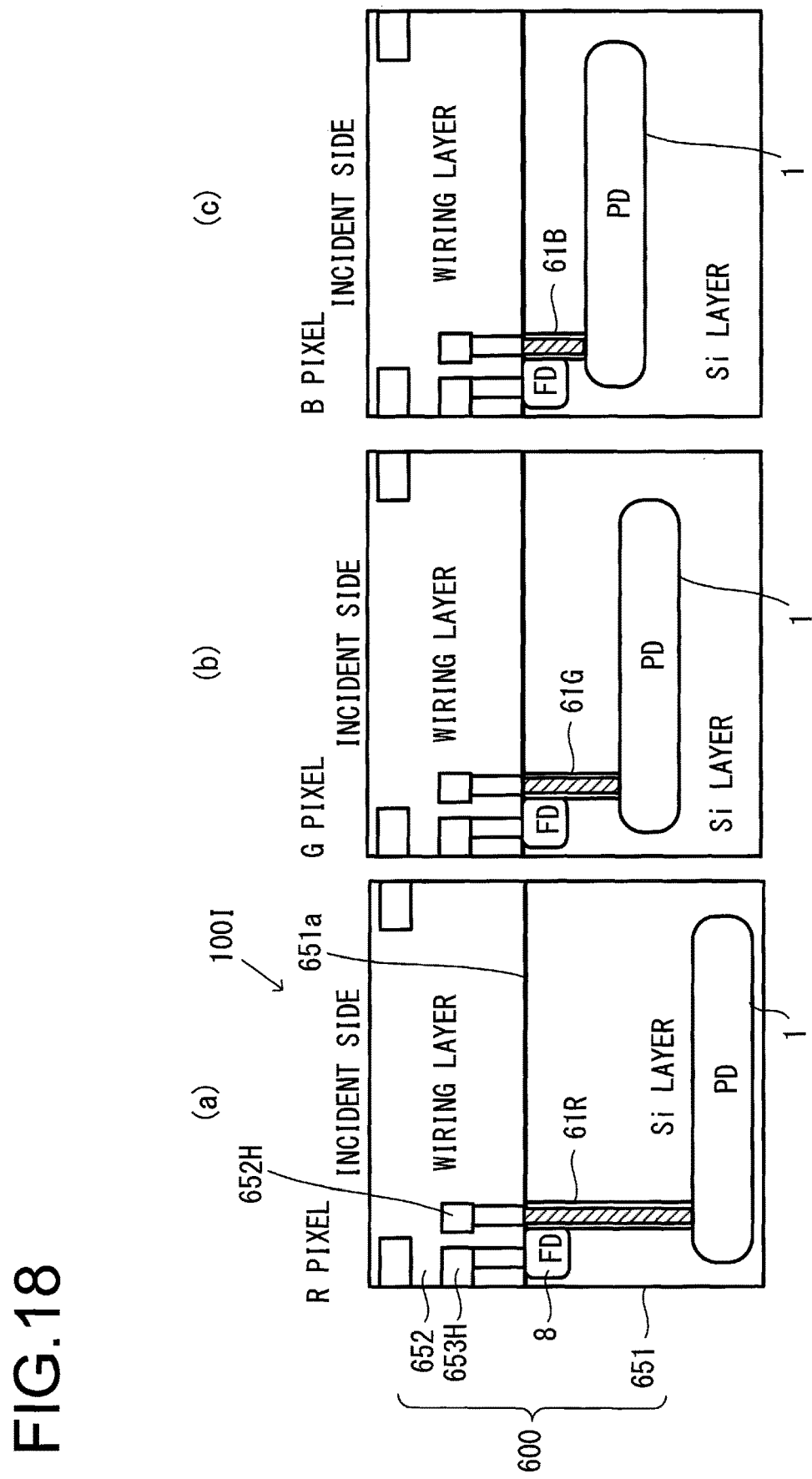
FIG. 18 is a cross-sectional view illustrating only main components of the pixel 20, in which the variation in FIG. 17 is applied to a front illumination type element.

The solid-state image sensor 100I in FIG. 18 is a front illumination type element as a modification of the solid-state image sensor 100H in FIG. 17.

Specifically, in the Si layer 651 of the R pixel, the PD 1 is formed at a fourth depth position from the surface of the Si layer 651 and the FD 8 is formed on the surface of the Si layer 651. In the Si layer 651 of the R pixel, the PD 1 is formed at a fifth depth position from the surface of the Si layer 651 and the FD 8 is formed on the surface of the Si layer 651. In the Si layer 651 of the B pixel, the PD 1 is formed at a sixth depth position from the surface of the Si layer 651 and the FD 8 is formed on the surface of the Si layer 651. Here, the fourth depth position>the fifth depth position>the sixth depth position.

In each RGB pixel, the vertical transfer gate 61R, 61G or 61B (hereinafter representatively referred to as 61) is provided in the Si layer 651 to transfer the electric charge between the PD 1 and the FD 8. For the gate length, the transfer gate 61R> the transfer gate 61G> the transfer gate 61B. The same parts as those in FIG. 17 are denoted by the same reference signs, and a detailed description thereof will be omitted.

The solid-state image sensors 100H and 100I in FIGS. 17 and 18 achieve the following advantageous effects.

(1) In each of the solid-state image sensors 100H and 100I according to the variations illustrated in FIGS. 17 and 18, in the pixel, the depths at which the photodiodes are formed and gate lengths of the vertical transfer gates are different in each other for each color of the color filters. Although the PDs 1 are formed at different depths for each color, the internal quantum efficiency can be improved without deteriorating transfer characteristics by optimizing the vertical transfer gate length and arranging the transfer gate at the vicinity of the PD 1.

Second Variation

The same structure may also be applied to a pixel having two photodiodes therein.

Figure 19:
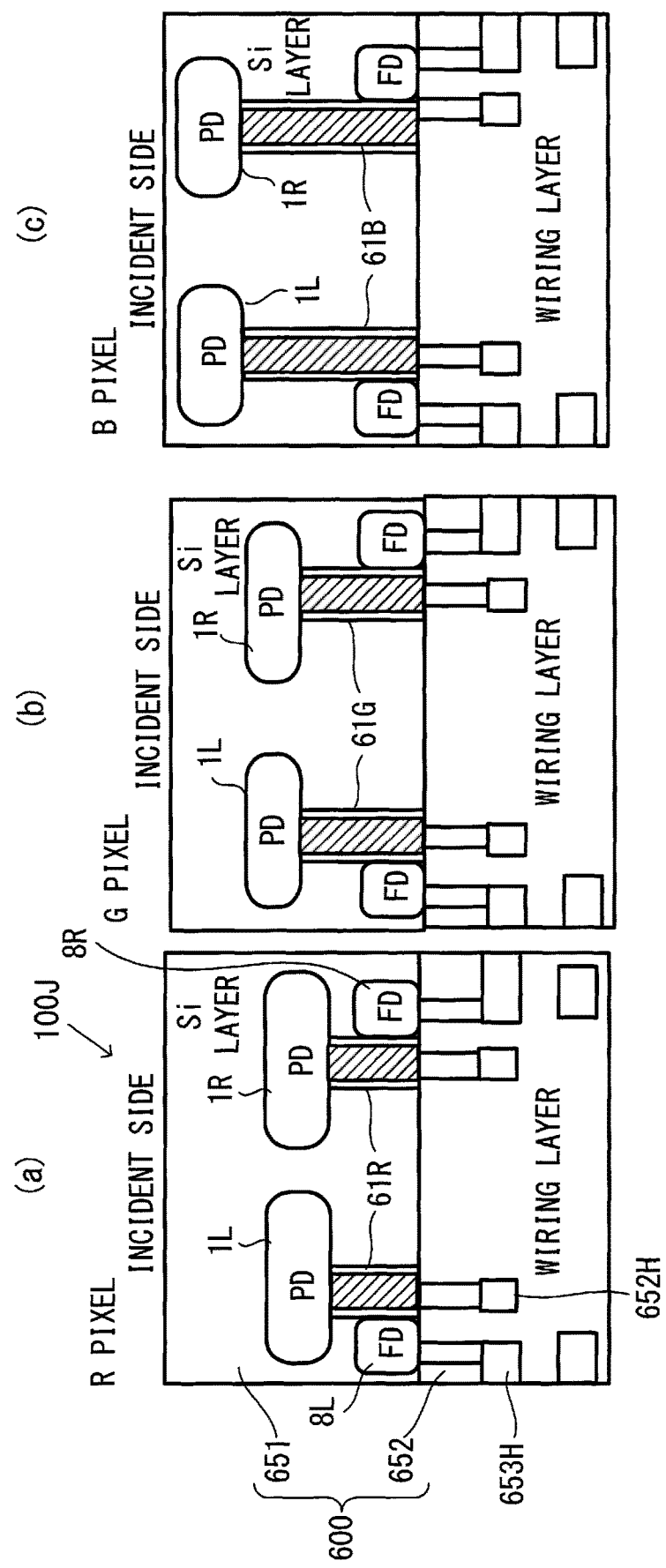
FIG. 19 is a cross-sectional view illustrating only main components of the pixel 20, in which the variation of FIG. 17 is applied to an element having a pair of PDs provided in one pixel.

Specifically, the solid-state image sensor 100J in FIG. 19 is a so-called 2PD-type element in which a pair of PDs 1L and 1R are provided in each pixel of the solid-state image sensor 100H in FIG. 17. FDs 8L and 8R corresponding to the pair of PDs 1L and 1R are provided.

The same parts are denoted by the same reference signs, and a detailed description thereof will be omitted.

The same also applies to a pixel having more (four, eight, and so on) photodiodes.

Figure 20:
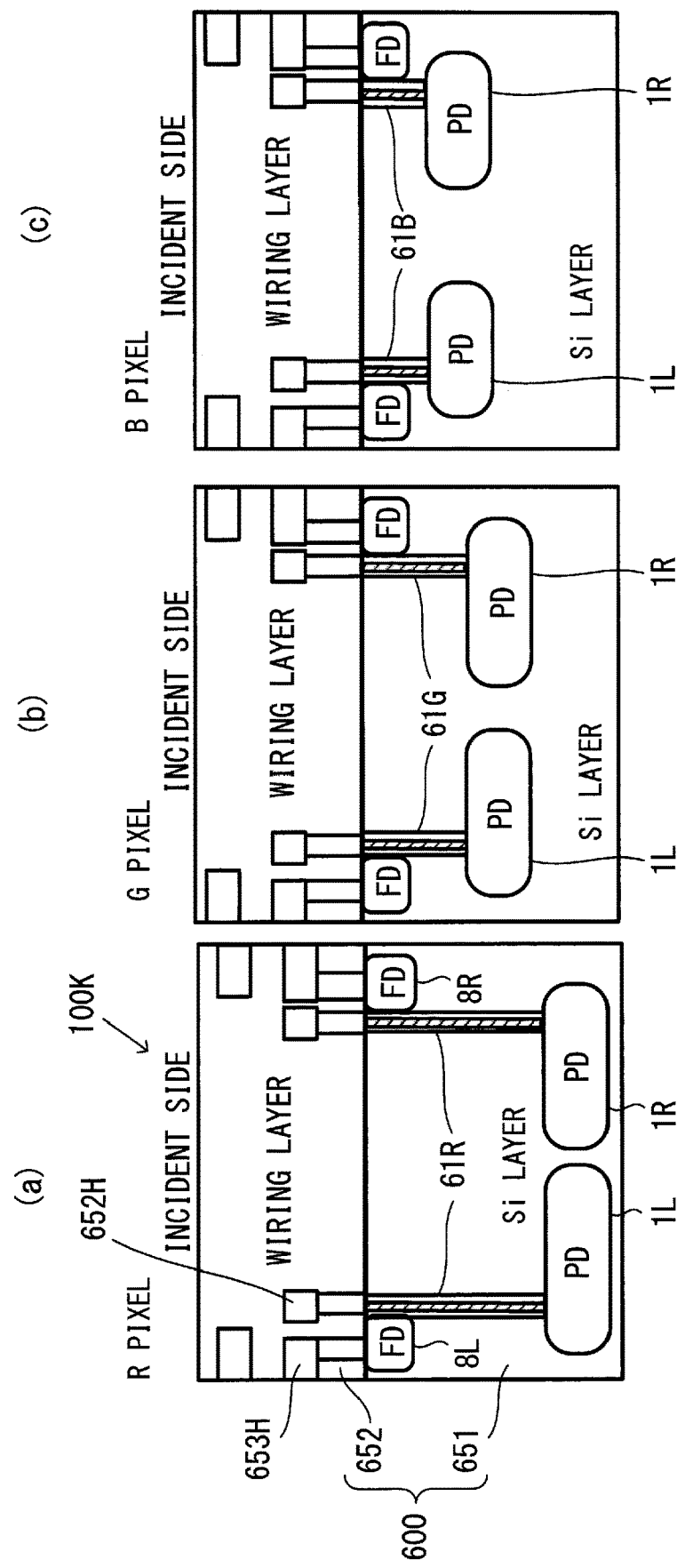
FIG. 20 is a cross-sectional view illustrating only main components of the pixel 20, in which the variation in FIG. 19 is applied to a front illumination type element.

The solid-state image sensor 100K in FIG. 20 is a so-called 2PD-type element in which a pair of PDs 1L and 1R are provided in each pixel of the solid-state image sensor 100I in FIG. 18. FDs 8L and 8R corresponding to the pair of PDs 1L and 1R are provided. The distance between PD 1L and PD1R, in a pair of which are used in longer wavelength, is larger.

The same parts are denoted by the same reference signs, and a detailed description thereof will be omitted.

The same also applies to a pixel having more (four, eight, and so on) photodiodes.

The solid-state image sensors 100H and 100I in FIGS. 17 and 18 achieve the following advantageous effects.

(1) Each of the solid-state image sensors in FIGS. 19 and 20 has two photodiodes in one pixel and has different photodiode aperture ratios for different colors of the color filters. In the examples in FIGS. 18 and 19, the distance between two photodiodes which are used in longer wavelength is smaller. In this manner, the separability can be optimized even if the photodiodes are formed at different depths for different colors, by adjusting the distance between two photodiodes for the colors so that the electron collection efficiency of a photodiode isolation unit can be changed.

For example, in a front illumination type pixel structure having a Bayer array, the separability is lower for a R wavelength absorbed in a deeper region. The separability becomes higher in the R pixel, if distances between two photodiodes are set wider in the order of R pixel, G pixel, and B pixel. Contrastingly, in a back illumination type pixel structure, the separability deteriorates for a B wavelength absorbed in a shallower region. Thus, the distance between two photodiodes is set wider in the order of B pixel, G pixel, and R pixel, which improves the separability also for the B pixel.

According to the solid-state image sensors 100H to 100K in FIGS. 17 to 20 described above, high S/N ratio can be achieved by improving the sensitivity for each color, and an autofocus accuracy is improved by improving the separability.

Variation of Third Embodiment

Figure 21:
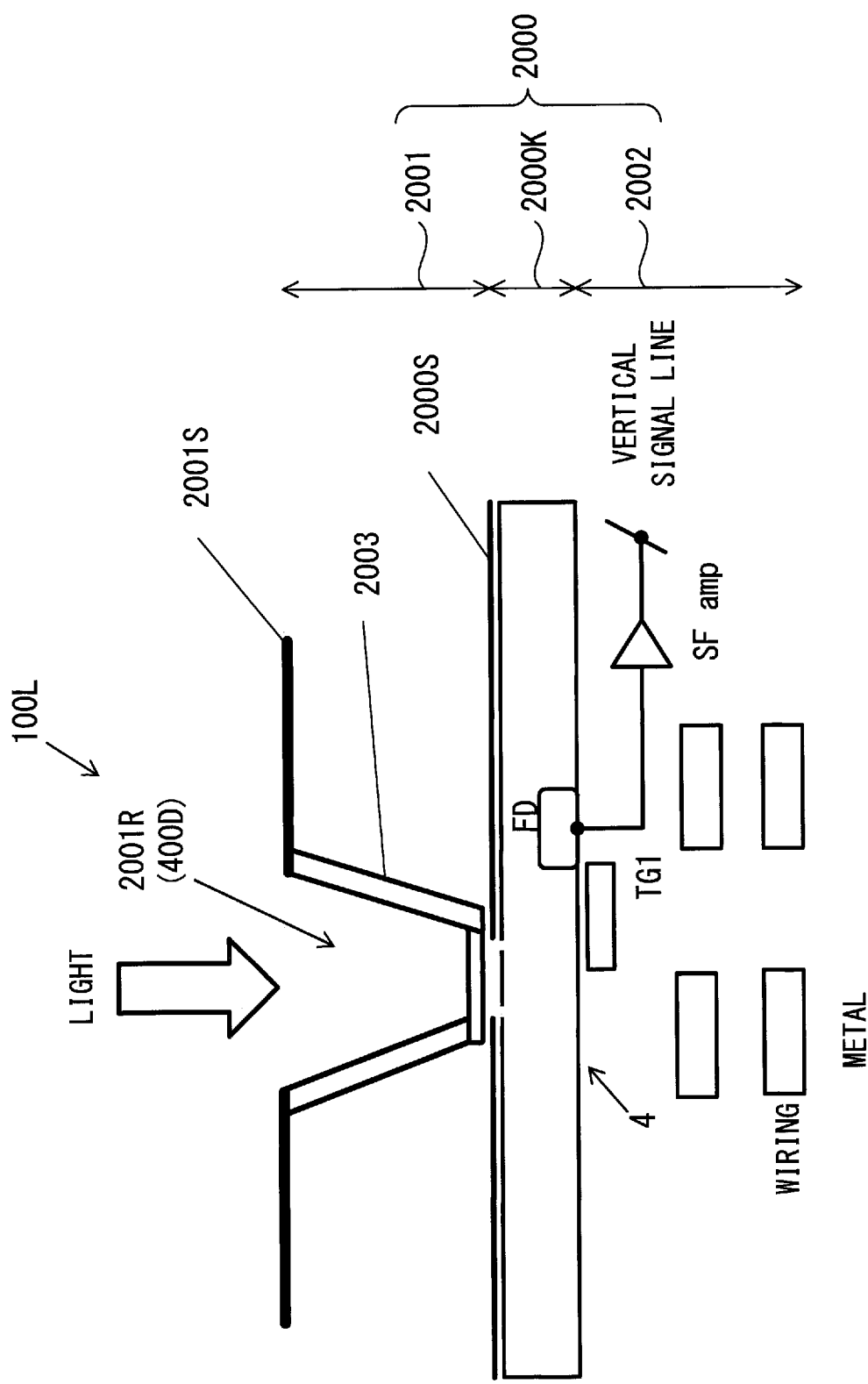
FIG. 21 is a cross-sectional view corresponding to FIG. 14, illustrating a variation of the third embodiment.

FIG. 21 is a view illustrating a solid-state image sensor 100L which is a variation of the third embodiment.

The same parts as those in FIG. 14 illustrating the third embodiment are denoted by the same reference signs, and differences will be described.

Main differences are as follows. The semiconductor substrate 202 of the solid-state image sensor 100E according to the third embodiment includes a semiconductor base 202K and a protruding semiconductor region 202T. The PD 1 is formed in the protruding semiconductor region 202T, and an optical path region 400B having a cross section of pyramidal shape is formed on the outer periphery of the PD 1.

The solid-state image sensor 100L according to a variation of the third embodiment includes a semiconductor substrate 2000. The semiconductor substrate 2000 includes a semiconductor base 2000K, a light shielding unit 2000S engaged with an upper surface of the semiconductor base 2000K, an oxide layer 2001 formed on the light shielding unit 2000S, and a wiring layer 2002 formed on a lower surface of the semiconductor base 2000K. The oxide layer 2001 has a pyramidal recess 2001R formed therein, which represents a pixel unit. The light shielding unit 2001S is formed on the upper surface of the oxide layer 2001, except for an opening of the recess 2001R. The light shielding unit is not formed on a surface of the recess 2001R, and a PD (a photoelectric conversion unit) 2003 is formed on inclined side wall surfaces and a bottom surface of the recess 2001R. The recess 2001R is an optical path region 400D that receives incident light.

The semiconductor base 2000K is provided with a floating diffusion (FD) 8, and a transfer transistor 4 for transferring an electric charge photoelectric converted by the PD

2003 to the floating diffusion 8. Conduction and non-conduction of the transfer transistor 4 is controlled by signal control of a gate electrode TG1. The electric charge accumulated in the floating diffusion 8 is amplified by an amplification circuit SFamp and read out to vertical signal lines.

The solid-state image sensor 100L according to the variation of the third embodiment configured in this manner includes the PD 2003 that receives incident light passed through a microlens (not shown), the semiconductor base 2000K on which the PD 2003 is formed, and the light shielding unit 2000S that blocks a part of the light passed through the microlens and enters the semiconductor substrate 2000K. The PD 2003 receives the incident light passed through the microlens (not shown), between the microlens and the light shielding unit 2000S.

The image sensor according to the present invention is not limited to the embodiments and variations described above, but the following image sensors are also encompassed in the present invention. They will be explained with reference to the drawings.

The following description will be made with reference to FIGS. 1 to 3.

(1) A solid-state image sensor 100 includes a semiconductor region 202 that is provided with a photoelectric conversion region including a photoelectric conversion unit 1 that photoelectrically converts an incident light and a circuit 300 that reads photoelectrically converted electric charge; and a light shielding unit 450 that has an opening 401 and blocks at least a part of the semiconductor region 202. At least a part of the photoelectric conversion unit 1 is provided along an incident direction of light that enters from the opening 401. In other words, at least a part of the photoelectric conversion unit 1 extends to a direction of an optical axis of a microlens 462.

Since at least a part of the photoelectric conversion unit 1 is provided along the incident direction of the light that enters from the opening 401, the opening 401 and the photoelectric conversion unit 1 are arranged so as to overlap each other in a plan view of the substrate, whereby it contributes to a reduction in size of the pixel.

(2) In the solid-state image sensor 100 as described in (1) above, at least a part of the photoelectric conversion region protrudes beyond the opening 401 to a light incident side.

For example, the photoelectric conversion region has a convex portion that protrudes toward light incident side beyond the opening 401.

(4) A solid-state image sensor 100 includes a photoelectric conversion region including a photoelectric conversion unit 1 that photoelectrically converts incident light to generate an electric charge, an electric charge transfer region including an electric charge transfer unit 4 to which the electric charge is transferred from the photoelectric conversion region, and a semiconductor region 202 in which the photoelectric conversion region and the electric charge transfer region are provided. At least a part of the semiconductor region 202 has a protruding region 202T on the light incident side, and at least a part of the photoelectric conversion unit 1 is provided in the protruding region 202T.

At least a part of the semiconductor region 202 has the protruding region 202T on a side onto which the incident light enters from the opening 401, and at least a part of the photoelectric conversion unit 1 is provided in the protruding region 202T. The opening 401 and the photoelectric conversion unit 1 are arranged so as to overlap each other in a plan view of the substrate, whereby it can achieve a reduction in size of the pixel.

(5) The solid-state image sensor 100 as described in (4) above has an opening 401, and the solid-state image sensor 100 includes a light shielding unit 450 that blocks at least a part of the semiconductor region 202, and the photoelectric conversion region is provided in the protruding region 202T in the incident direction of light enters from the opening 401.

(6) A solid-state image sensor 100 includes a photoelectric conversion region including a photoelectric conversion unit 1 that photoelectrically converts incident light to generate an electric charge, an electric charge transfer region including an electric charge transfer unit 4 to which the electric charge is transferred from the photoelectric conversion region, and a semiconductor region 202 in which the photoelectric conversion region and the electric charge transfer region are provided. At least a part of the semiconductor region 202 is provided so as to protrude to the incident region 400 and at least a part of the photoelectric conversion region is provided so as to protrude to the incident region 400.

At least a part of the semiconductor region 202 is provided so as to protrude to the incident region 400 and at least a part of the photoelectric conversion region is provided so as to protrude to the incident region 400, whereby it contributes to a reduction in size of the pixel. Additionally, because at least a part of the photoelectric conversion region is provided so as to protrude to the incident region 400, light is also enters from the periphery of the photoelectric conversion region. This enhances a conversion gain of the element.

(7) In the solid-state image sensor 100 as described in (6) above, at least a part of the semiconductor region 202 has a protruding region 202T protrudes toward a side on which incident light enters the incident region 400, and at least a part of the photoelectric conversion unit 1 is provided in the protruding region 202T.

(8) The solid-state image sensor 100 as described in claim 7) above has an opening 401 and includes a light shielding unit 450 that blocks at least a part of the semiconductor region 202. The protruding region 202T is a region that extends toward the incident direction of light enters from the opening 401.

(9) In the solid-state image sensor 100 as described in (6) to (8) above, the incident region is an optical path region 400 of the incident light.

(10) In the solid-state image sensor 100 as described in (1) to (9) above, the light shielding unit 450 is formed so as to shield the semiconductor region 202 except for the photoelectric conversion region.

(11) In the solid-state image sensor as described in (1) to (10) above, a wiring is formed on other surface, which is opposite to the surface receiving the incident light, to provide the wiring region 203.

The following description will be made with reference to FIGS. 4 to 8.

(12) In the solid-state image sensor as described in (4) to (9) above, the solid-state image sensor is provided in a SOI substrate 500 in which one semiconductor region 501 and other semiconductor region 502 are separated by a buried oxide layer 503; the solid-state image sensor includes an amplification region including an amplification unit 11 that amplifies an output of an electric charge accumulation unit 8 in an electric charge transfer region; and the photoelectric conversion region and the electric charge transfer region are formed in the one semiconductor region 501 while the amplification region is formed in the other semiconductor region 502.

(13) In the solid-state image sensor as described in (12) above, the electric charge transfer region is provided with the transfer unit 4 that transfers the electric charge as a result of the photoelectric conversion in the photoelectric conversion region, and the floating diffusion 8 that accumulates the transferred electric charge, wherein the floating diffusion 8 is formed below the photoelectric conversion unit 1.

(14) In the solid-state image sensor as described in (13) above, the amplification unit 11 is arranged directly under the floating diffusion 8 and is connected to the floating diffusion 8 by a wiring passing through the buried oxide layer 503.

(15) In the solid-state image sensor as described in (12) to (14) above, a semiconductor substrate, that is different from the ISO substrate 500 having the selection unit 12 for selecting the output amplified by the amplification unit 11, is stacked on the other semiconductor region 502 of the IOS substrate 500.

The present invention is not limited to the embodiments and variations described above. Solid-state image sensors changed or modified in various manners without departing from the present invention are also encompassed within the scope of the present invention.

Figure 22:
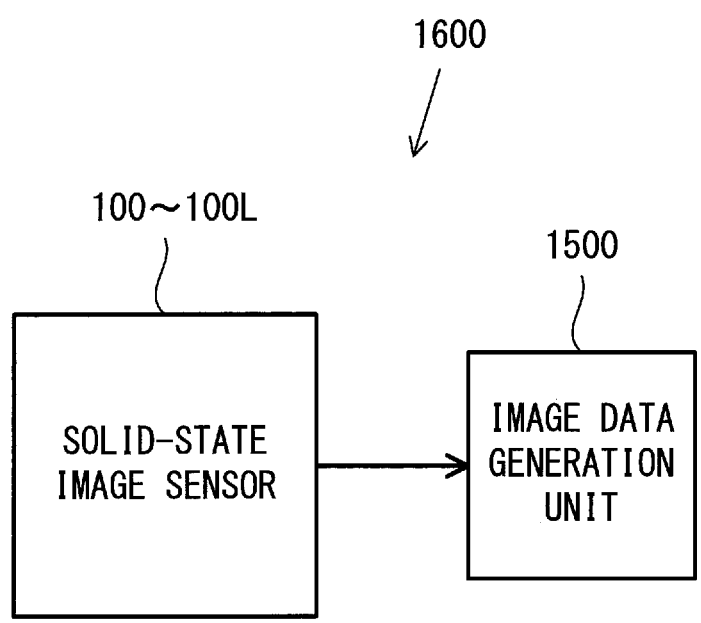
FIG. 22 is a block diagram illustrating an image-capturing device according to the present invention.

Further, as illustrated in FIG. 22, the present invention may be implemented as an image-capturing device 1600 including an image sensor 100 to 100L in one of the embodiments and variations described above and a generation unit 1500 that generates image data based on signals outputted from the image sensor 100 to 100L.

The disclosure of the following priority application is herein incorporated by reference:

Japanese Patent Application No. 2015-195347 (filed Sep. 30, 2015)

REFERENCE SIGNS LIST

1 . . . photodiode, 1a . . . photoelectric conversion region, 1b . . . surface region, 1c . . . surface, 1d . . . peripheral surface, 4 . . . transfer transistor, 4g . . . transfer gate electrode, 4H . . . transfer wiring, 8 . . . floating diffusion, 11 . . . amplification transistor, 12 . . . selection transistor, 13 . . . reset transistor, 20 . . . pixel, 21 . . . vertical signal line, 100 to 100K . . . solid-state image sensor, 200 . . . semiconductor substrate, 201 . . . oxide film, 202 . . . semiconductor region, 203 . . . wiring region, 202K, 501aK . . . base region, 202T, 501aT . . . protruding region, 400 . . . optical path region, 401 . . . opening, 450, 452 . . . light shielding film, 451 . . . reflection film, 500 . . . SOI substrate, 501 . . . first semiconductor substrate, 502 . . . second semiconductor substrate, 503 . . . buried oxide layer

The invention claimed is:

1. An image sensor comprising:
a semiconductor substrate having a light receiving unit that receives light passed through a microlens; and
a light shielding unit that blocks a part of the light that enters the semiconductor substrate, the light shielding unit having an opening, wherein:
at least a part of the light receiving unit is formed passing through the opening; and
at least a part of the light receiving unit passing through the opening has a plurality of light receiving surfaces that are provided in the microlens side of the light shielding unit along a direction of an optical axis of the microlens, the plurality of light receiving surfaces receiving the light passed through the microlens, and the plurality of light receiving surfaces being between the microlens and the light shielding unit.

2. The image sensor according to claim 1, wherein:
the plurality of light receiving surfaces receives light entering from a direction that intersects an optical axis of the microlens.

3. The image sensor according to claim 1, wherein:
the plurality of light receiving surfaces receives light on a light entering side in comparison with the light shielding unit.

4. The image sensor according to claim 3, wherein:
at least a part of the light receiving unit protrudes to the light entering side beyond the light shielding unit.

5. The image sensor according to claim 4, wherein:
the light shielding unit has an opening, and
the at least a part of the light receiving unit protrudes from the opening beyond the light shielding unit to the light entering side.

6. The image sensor according to claim 1, wherein:
the semiconductor substrate has a waveguide between the microlens and the light shielding unit to cause light passed through the microlens to enter the light receiving unit.

7. The image sensor according to claim 6, wherein:
the waveguide causes light passed through the microlens and blocked by the light shielding unit to enter the light receiving unit.

8. The image sensor according to claim 6, wherein
the light shielding unit has an opening, and
the waveguide is provided between the microlens and the opening.

9. The image sensor according to claim 1, wherein:
at least a part of the light receiving unit has a photoelectric conversion unit that photoelectrically converts the received light to generate an electric charge.

10. The image sensor according to claim 9, further comprising:
an accumulation unit that accumulates the electric charge generated by the photoelectric conversion unit; and
a transfer unit that transfers the electric charge generated by the photoelectric conversion unit to the accumulation unit, wherein
the photoelectric conversion unit, the transfer unit, and the accumulation unit are provided along a direction of an optical axis of the microlens.

11. The image sensor according to claim 10, wherein:
the transfer unit has a transfer path that transfers the electric charge generated by the photoelectric conversion unit to the accumulation unit.

12. An image-capturing device comprising:
an image sensor according to claim 1; and
a generation unit that generates image data based on a signal outputted from the image sensor.

13. The image sensor according to claim 10, wherein:
the transfer unit is provided between the photoelectric conversion unit and the accumulation unit along the direction of the optical axis of the microlens.

14. The image sensor according to claim 10, wherein:
the photoelectric conversion unit, the transfer unit, and the accumulation unit are provided in the order of the photoelectric conversion unit, the transfer unit, and the accumulation unit along the direction of the optical axis of the microlens.

15. The image sensor according to claim 10, wherein:
the photoelectric conversion unit, the transfer unit, and the accumulation unit are provided on the optical axis of the microlens.

16. The image sensor according to claim 10, wherein:
in the direction of the optical axis of the microlens, one the part of the photoelectric conversion unit is provided in the microlens side of the light shielding unit and the other part of the photoelectric conversion unit is provided in the accumulation unit side of the light shielding unit.

17. An image sensor comprising:
a semiconductor substrate having a light receiving unit that receives light passed through a microlens; and
a light shielding unit that blocks a part of the light that enters the semiconductor substrate, the light shielding unit having an opening, wherein:
at least a part of the light receiving unit is formed passing through the opening;
at least a part of the light receiving unit passing through the opening has a plurality of light receiving surfaces that receives the light passed through the microlens, the plurality of light receiving surfaces being between the microlens and the light shielding unit;
the light shielding unit has a first portion that is immediately adjacent to the part of the light receiving unit that is formed passing through the opening and a second portion that is further away from the part of the light receiving unit that is formed passing through the opening than the first portion is; and
along an optical axis of the microlens, the part of the light receiving unit that is formed passing through the opening is closer to the microlens than the first portion is.

\* \* \* \* \*